(12) United States Patent
Hontz et al.

(10) Patent No.: US 10,202,196 B2
(45) Date of Patent: Feb. 12, 2019

(54) PASSENGER SEAT HEADREST

(71) Applicant: B/E Aerospace, Inc., Wellington, FL (US)

(72) Inventors: Jeff Hontz, Winston Salem, NC (US); Cameron Baker, London (GB); Martin Darbyshire, London (GB)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 15/471,855

(22) Filed: Mar. 28, 2017

(65) Prior Publication Data

US 2017/0197529 A1    Jul. 13, 2017

Related U.S. Application Data

(63) Continuation-in-part of application No. 15/072,535, filed on Mar. 17, 2016, now Pat. No. 9,611,041.

(60) Provisional application No. 62/420,391, filed on Nov. 10, 2016, provisional application No. 62/421,159, filed on Nov. 11, 2016, provisional application No. 62/135,795, filed on Mar. 20, 2015.

(51) Int. Cl.
| | |
|---|---|
| *B60N 2/10* | (2006.01) |
| *B64D 11/06* | (2006.01) |
| *B60N 2/58* | (2006.01) |
| *B60N 2/885* | (2018.01) |

(52) U.S. Cl.
CPC .......... *B64D 11/0642* (2014.12); *B60N 2/58* (2013.01); *B60N 2/885* (2018.02); *B64D 11/0646* (2014.12)

(58) Field of Classification Search
CPC .... B60N 2/2851; B60N 2/2881; B60N 2/806; B60N 2/80; B60N 2/874; B60N 2002/899; B60N 2/885; B60N 2/85; B64D 11/0642; B64D 11/0646; B64D 11/06
See application file for complete search history.

(56) References Cited

U.S. PATENT DOCUMENTS

| | | | | | |
|---|---|---|---|---|---|
| 3,226,159 | A | * | 12/1965 | Binding ................. | B60N 2/882 297/397 |
| 3,511,535 | A | * | 5/1970 | Gunlock ................ | B60N 2/818 297/410 |
| 4,519,650 | A | * | 5/1985 | Terada .................... | B60N 2/80 297/452.18 |
| 4,545,618 | A | * | 10/1985 | Kitamura ............... | B60N 2/815 297/410 |
| 4,589,698 | A | * | 5/1986 | Suzuki ................... | B60N 2/824 297/410 |

(Continued)

*Primary Examiner* — Shin H Kim
(74) *Attorney, Agent, or Firm* — Clements Bernard Walker PLLC

(57) ABSTRACT

Apparatus and associated methods relate to an adjustable passenger seat headrest which includes articulating side wings, provides a more acute angle of support, and fits the width of a standard economy seat when stowed. In some embodiments, fabric may be stretched across the extreme ends of the wings to a center headrest, forming a hammock in which a passenger may rest their head. In an illustrative example, passengers may be provided with improved head support and comfort by employment of a mechanism that enables the side wings of the headrest to be articulated further apart, and/or extend out further from the back of the seat. These features may offer a more acute angle of passenger head support.

18 Claims, 25 Drawing Sheets

(56) References Cited

U.S. PATENT DOCUMENTS

| | | | | |
|---|---|---|---|---|
| 5,364,164 A * | 11/1994 | Kuranami | A47C 7/38 | 297/408 |
| 5,868,471 A * | 2/1999 | Graham | A47C 7/383 | 297/397 |
| 6,099,077 A * | 8/2000 | Isaacson | B60N 2/818 | 297/410 |
| 6,123,389 A * | 9/2000 | O'Connor | A47C 7/383 | 297/397 |
| 6,139,106 A * | 10/2000 | Aldridge | A61C 19/00 | 297/391 |
| 6,467,846 B2 * | 10/2002 | Clough | B60N 2/885 | 297/410 |
| 6,513,871 B2 * | 2/2003 | Bartels | B60N 2/885 | 297/216.12 |
| 6,601,804 B2 * | 8/2003 | Bisch | A47C 7/383 | 248/118 |
| 6,669,143 B1 * | 12/2003 | Johnson | B64D 11/06 | 244/118.6 |
| 6,692,071 B2 * | 2/2004 | Fowler | B60N 2/4235 | 297/216.12 |
| 6,761,409 B2 * | 7/2004 | Ford | B60N 2/818 | 297/410 |
| 6,883,870 B2 * | 4/2005 | Jost | B60N 2/838 | 297/391 |
| 6,893,094 B2 * | 5/2005 | O'Connor | A47C 7/383 | 297/397 |
| 7,040,705 B2 * | 5/2006 | Clough | B60N 2/885 | 297/407 |
| 7,080,886 B2 * | 7/2006 | Bauer | A47C 7/38 | 297/409 |
| 7,264,313 B2 * | 9/2007 | Clough | A47C 7/38 | 297/407 |
| 7,500,721 B2 * | 3/2009 | Beroth | B60N 2/821 | 297/410 |
| 7,681,954 B2 * | 3/2010 | Barrou | B64D 11/06 | 297/408 |
| 7,744,158 B2 * | 6/2010 | Schurg | B64D 11/0647 | 297/391 |
| D682,567 S * | 5/2013 | Khalil | D6/356 | |
| D682,568 S * | 5/2013 | Khalil | D6/356 | |
| D682,569 S * | 5/2013 | Khalil | D6/356 | |
| D682,570 S * | 5/2013 | Khalil | D6/356 | |
| 8,898,840 B1 * | 12/2014 | Majette | A47C 7/383 | 297/393 |
| 8,911,018 B2 * | 12/2014 | Gaither | B60N 2/4879 | 297/391 |
| 8,911,020 B2 * | 12/2014 | Westerink | B60N 2/80 | 297/407 |
| 8,944,505 B2 * | 2/2015 | Khalil | B60N 2/22 | 244/118.6 |
| 8,950,813 B2 * | 2/2015 | Nawaz | B60N 2/4844 | 297/406 |
| 9,132,918 B2 * | 9/2015 | Bamford | B60N 3/004 | |
| 9,550,438 B2 * | 1/2017 | Mizobata | B60N 2/809 | |
| 9,611,041 B2 * | 4/2017 | Baker | B60N 2/885 | |
| 2004/0007910 A1 * | 1/2004 | Skelly | A47C 7/38 | 297/406 |
| 2009/0309346 A1 * | 12/2009 | Van Druff | B60R 22/26 | 280/806 |
| 2015/0102644 A1 * | 4/2015 | Rajasingham | B60N 2/2884 | 297/216.11 |
| 2017/0197529 A1 * | 7/2017 | Hontz | B64D 11/0646 | |

\* cited by examiner

PASSENGER SEAT HEADREST

CROSS REFERENCE TO RELATED APPLICATIONS

This application claims priority to U.S. Provisional Patent Application Ser. No. 62/420,391 entitled "Improved Headrest" to Hontz, filed on Nov. 10, 2016, and to U.S. Provisional Patent Application Ser. No. 62/421,159 entitled "Improved Headrest" to Hontz, filed on Nov. 11, 2016, and is also a Continuation-in-Part of U.S. application Ser. No. 15/072,535 entitled "Passenger Seat Headrest," filed by Baker, et al., on Mar. 17, 2016, which claims the benefit of U.S. Provisional Patent Application Ser. No. 62/135,795 entitled "Passenger Seat Headrest," filed by Baker, et al., on Mar. 20, 2015. All above identified applications are hereby incorporated by reference in their entireties.

This application incorporates by reference, in their entireties, the following prior patent applications by B/E Aerospace, Inc. directed to passenger seat headrests: U.S. patent application Ser. No. 10/194,666, entitled "Headrest Mounting Plate, Seat Headrest, and Passenger Seat with Headrest," filed Jul. 12, 2002, and U.S. Pat. No. 7,201,448 entitled "Headrest Support Assembly," filed Oct. 6, 2004 and issued Jun. 9, 2005.

BACKGROUND

Seats on airplanes are required by the National Aircraft Standard to provide at least 36½ inches of back support in all passenger seats. Headrests are often used to extend the height of the seat back to the required minimum while limiting the weight of the seat on airplanes. Making these headrests adjustable in height provides an additional feature to make passengers more comfortable on their journey. Headrests also serve as important safety features in airplanes for seats that face the tail of the airplane. Typical headrests are connected to the seat and do not adjust to accommodate the various positions of the seat or the various positions a passenger may adopt while sitting or reclining.

To rest or sleep during long flights, because typical headrests are static on configuration or minimally adjustable, passengers often carry on personal neck support pillows for comfort and support during repose. For passenger comfort and convenience, an improvement in headrest design is needed that supports resting passengers and improves head and neck comfort during flight.

SUMMARY OF ILLUSTRATIVE EMBODIMENTS

Apparatus and associated methods relate to an adjustable passenger seat headrest which includes articulating side wings, provides a more acute angle of support, and fits the width of a standard economy seat when stowed. In some embodiments, fabric may be stretched across the extreme ends of the wings to a center headrest, forming a hammock in which a passenger may rest their head. In an illustrative example, passengers may be provided with improved head support and comfort by employment of a mechanism that enables the side wings of the headrest to be articulated further apart, and/or extend out further from the back of the seat. These features may offer a more acute angle of passenger head support.

Various embodiments may achieve one or more advantages. For example, some embodiments may provide a range of "angle of support" for the comfort of a passenger's head.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values or dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION OF ILLUSTRATIVE EMBODIMENTS

Figure 1A:
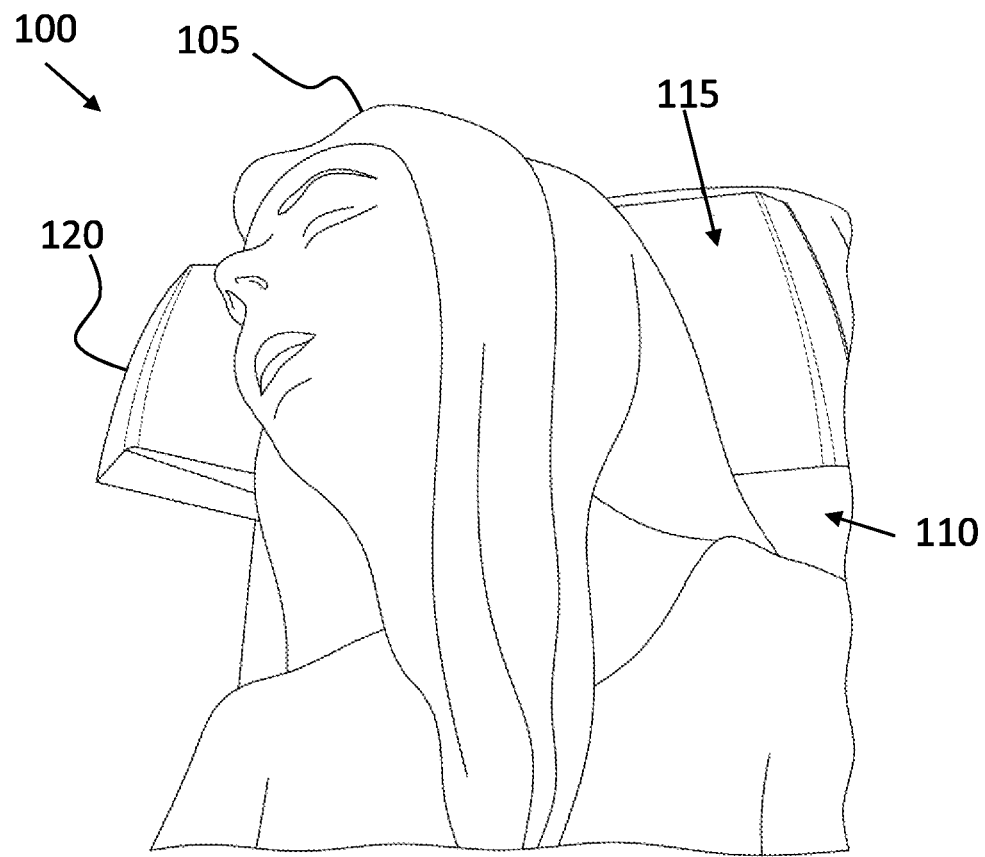
FIG. 1A depicts a perspective view of an exemplary headrest in use by a passenger.

The description set forth below in connection with the appended drawings is intended as a description of various embodiments of the disclosed subject matter and is not necessarily intended to represent the only embodiments. In certain instances, the description includes specific details for the purpose of providing an understanding of the disclosed embodiments. However, it will be apparent to those skilled in the art that the disclosed embodiments may be practiced without those specific details. In some instances, well-known structures and components may be shown in block diagram form in order to avoid obscuring the concepts of the disclosed subject matter.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "proximate," "minor," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

FIG. 1A depicts a perspective view of an exemplary headrest in use by a passenger. A use case scenario 100 includes a passenger 105. The passenger 105 is seated in a passenger seat 110. The passenger seat 110 includes a headrest 115. The passenger 105 deploys a right articulating wing cushion 120, which may provide a head resting pocket for the passenger 105. In some embodiments, the passenger's head may be supported by a "hammock" formed by a stretch fabric, a fixed head cushion, and a deployed wing cushion.

Figure 1B:
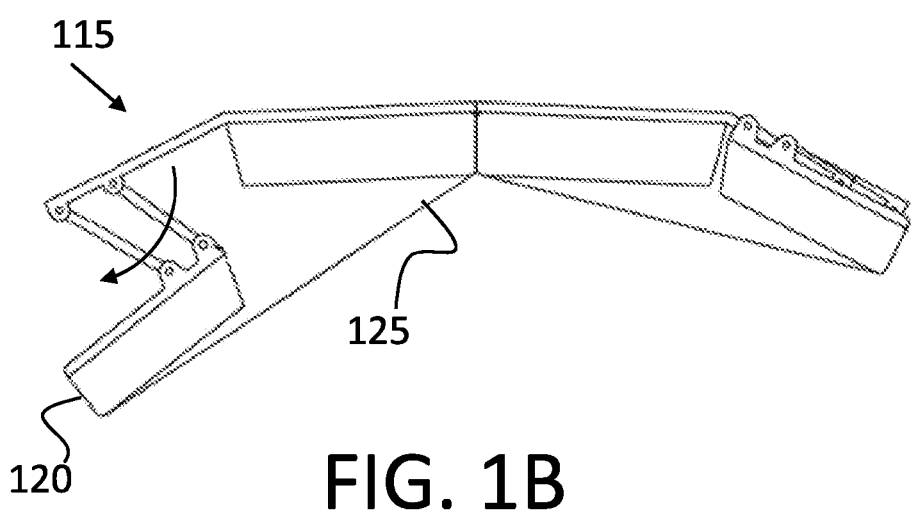
FIG. 1B depicts a plan view of an exemplary headrest illustrating articulation of a wing cushion.

FIG. 1B depicts a plan view of an exemplary headrest illustrating articulation of a wing cushion. The headrest 115 is shown with the articulating wing cushion 120. The articulating wing cushion 120 is coupled to a suitable stretch fabric 125.

Figure 2:
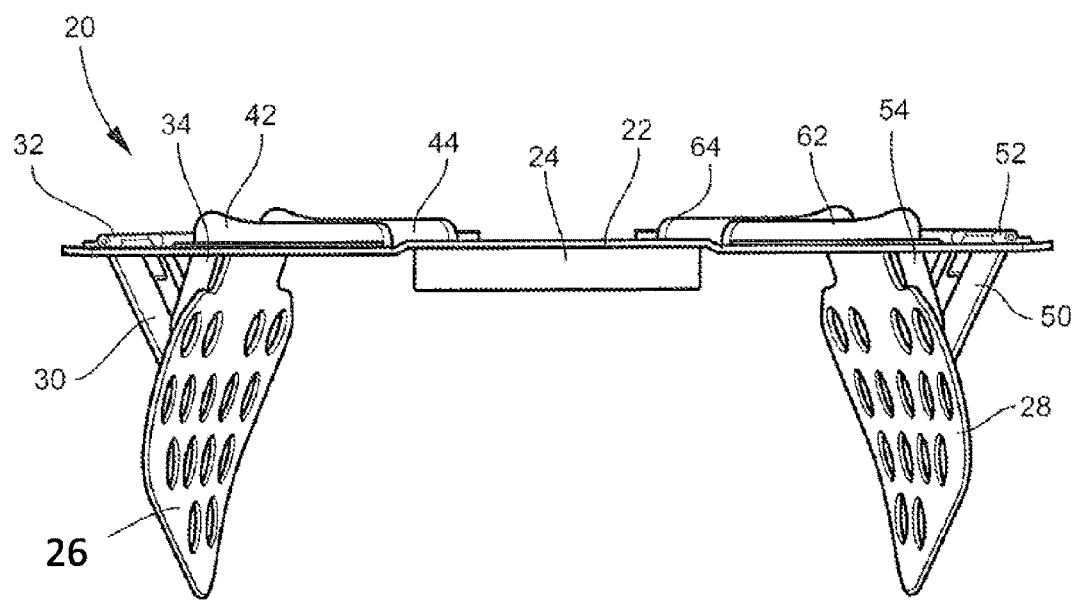
FIG. 2 depicts a top plan view of an exemplary headrest.
Figure 4:
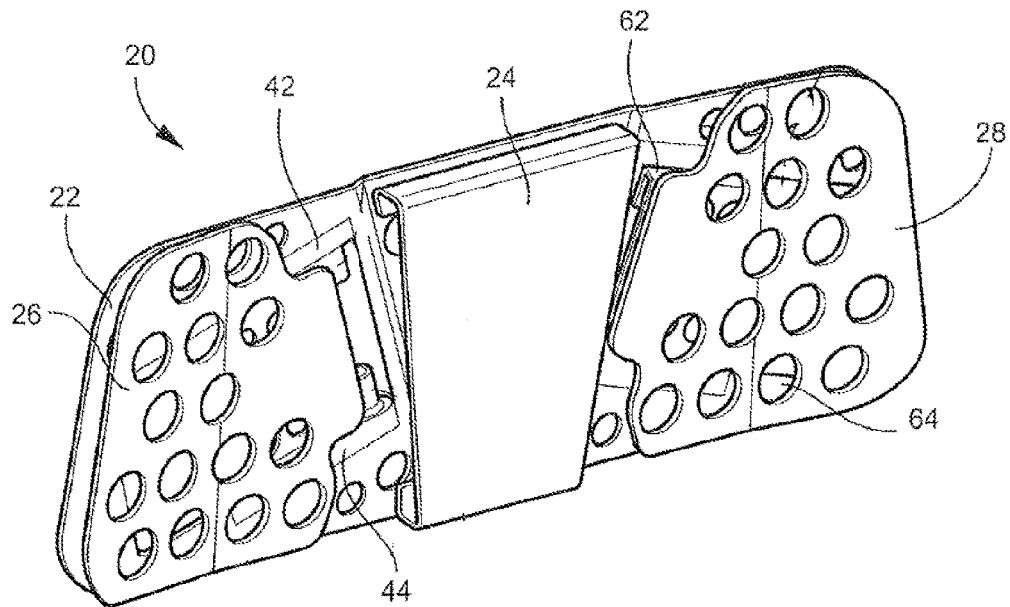
FIG. 4 depicts a perspective view of an exemplary headrest in a retracted position.

FIG. 2 depicts a top plan view of an exemplary headrest. A headrest 20 includes a mounting base 22. The mounting base 22 is fixedly coupled to a central support 24. The mounting base 22 is fixedly attached to a pair of hinges 32 and 52. The mounting base 22 is hingedly coupled to a pair of support arms 30 and 50, via the pair of hinges 32 and 52. The support arms 30 and 50 are coupled to a pair of headrest wings 26 and 28. The support arms 30 and 50 are fixedly hingedly coupled to a pair of slide hinge arms 34 and 54, mounted for hinged movement relative to the support arms 30 and 50. The pair of slide hinge arms 34 and 54 are slidably engaged with a pair of upper slide rails 42 and 62. The pair of slide hinge arms 34 and 54 are also slidably engaged with a pair of lower slide rails 44 and 64. In an illustrative example, the upper slide rails 42 and 62, and the lower slide rails 44 and 64 may facilitate incremental movement of the pair of headrest wings 26 and 28, between the deployed position as shown in FIG. 2, and the retracted position as shown in FIG. 4.

In some examples, when the pair of headrest wings 26 and 28 are fully retracted, the support arms 30 and 50, and the slide hinge arms 34 and 54 may unfold and reside in substantially the same longitudinal plane.

In some embodiments, the mounting base 22 may attach to a seat back, not shown. In one example, a conventional vertical slide assembly from a passenger seat back may facilitate articulation of the headrest 20 up and down relative to the seat back. In some embodiments, the headrest 20 may provide adjustment and passenger comfort.

Figure 3:
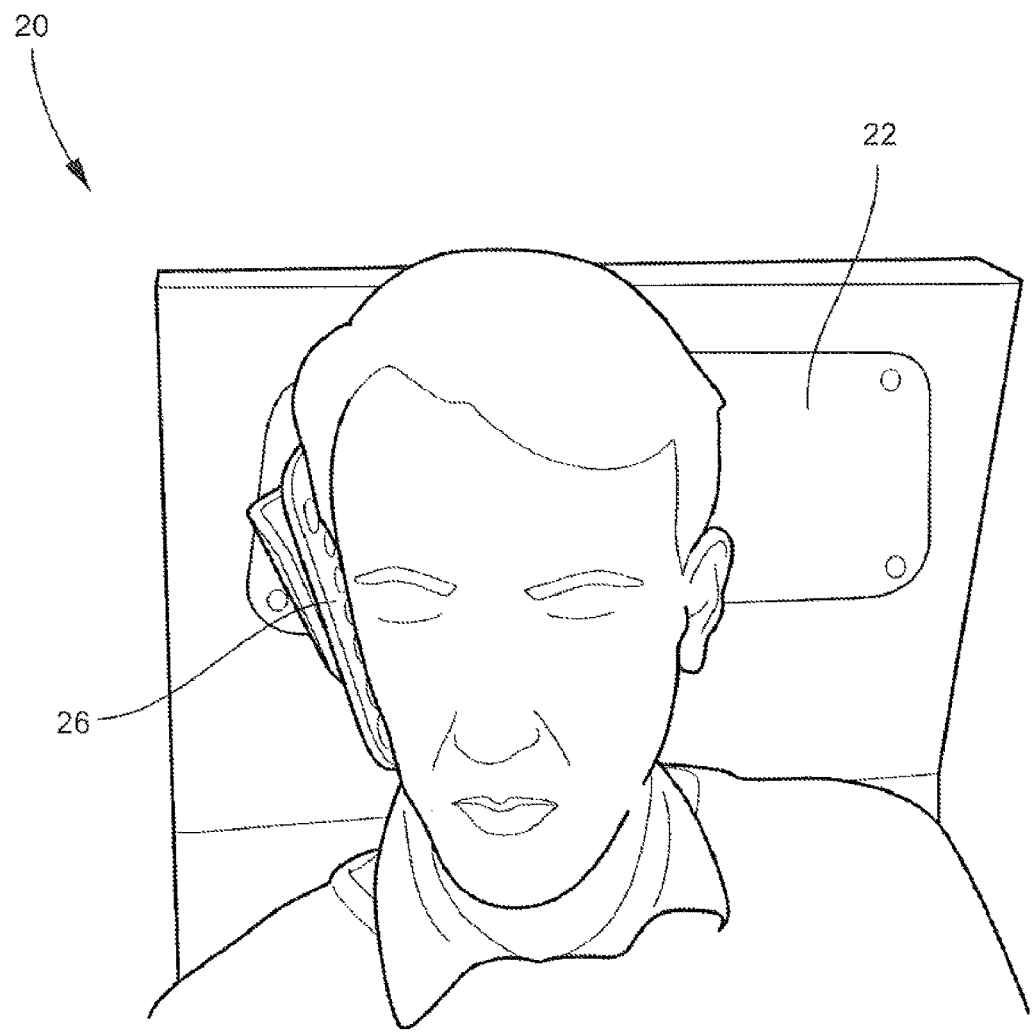
FIG. 3 depicts a perspective view of an exemplary headrest employed by a passenger.

FIG. 3 depicts a perspective view of an exemplary headrest employed by a passenger. The headrest in use 20 includes the headrest wing 26. The headrest wing 26 is anchored by the mounting base 22.

FIG. 4 depicts a perspective view of an exemplary headrest in a retracted position. The headrest 20 includes the mounting base 22. The mounting base 22 is fixedly coupled to the central support 24. The mounting base 22 is hingedly coupled to the pair of headrest wings 26 and 28. The mounting base 22 includes the pair of upper slide rails 42 and 62. The pair of upper slide rails 42 and 62 are parallel to the pair of lower slide rails 44 and 64.

Figure 5:
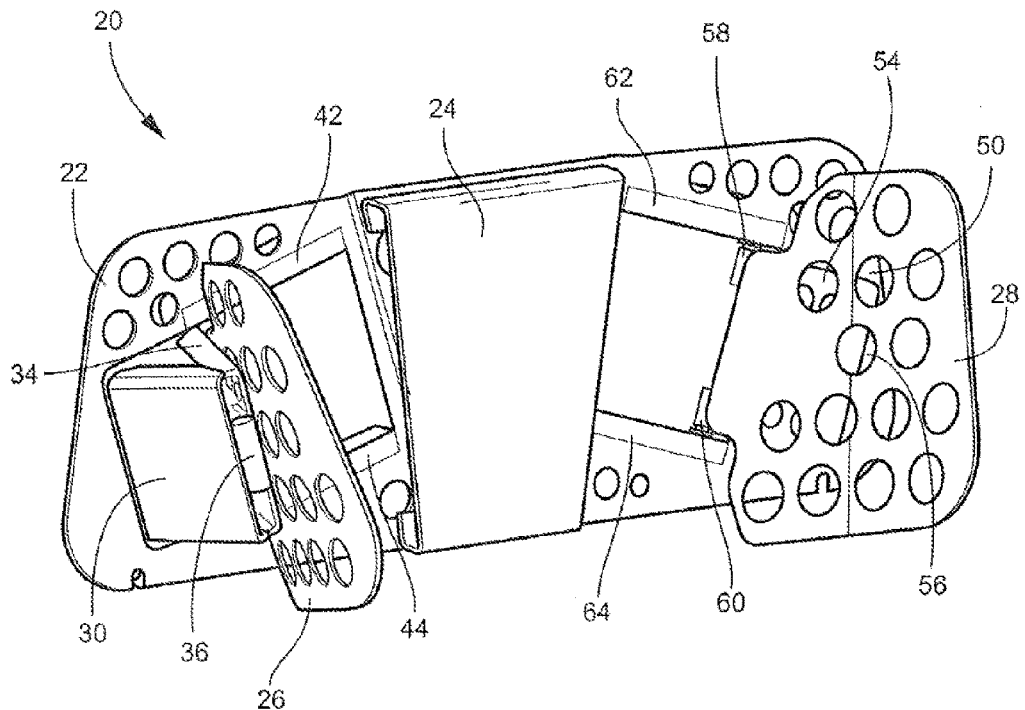
FIG. 5 depicts a perspective view of an exemplary headrest in a deployed position.

FIG. 5 depicts a perspective view of an exemplary headrest in a deployed position. The headrest 20 includes the mounting base 22. The mounting base 22 is fixedly coupled to the central support 24. The mounting base 22 is hingedly coupled to the pair of support arms 30 and 50. The support arms 30 and 50 are fixedly attached to a pair of hinges 36 and 56. The hinges 36 and 56 couple to the pair of slide hinge arms 34 and 54, mounted for hinged movement relative to the support arms 30 and 50. The pair of slide hinge arms 34 and 54 are coupled to the pair of headrest wings 26 and 28. The slide hinge arm 54 is rotatably coupled to an upper roller 58 and a lower roller 60. The upper roller 58 (and an upper roller blocked from view on the other side) is slidably engaged with the pair of upper slide rails 42 and 62. The lower roller 60 (and a lower roller blocked from view on the other side) is slidably engaged with the pair of lower slide rails 44 and 64.

Figure 6:
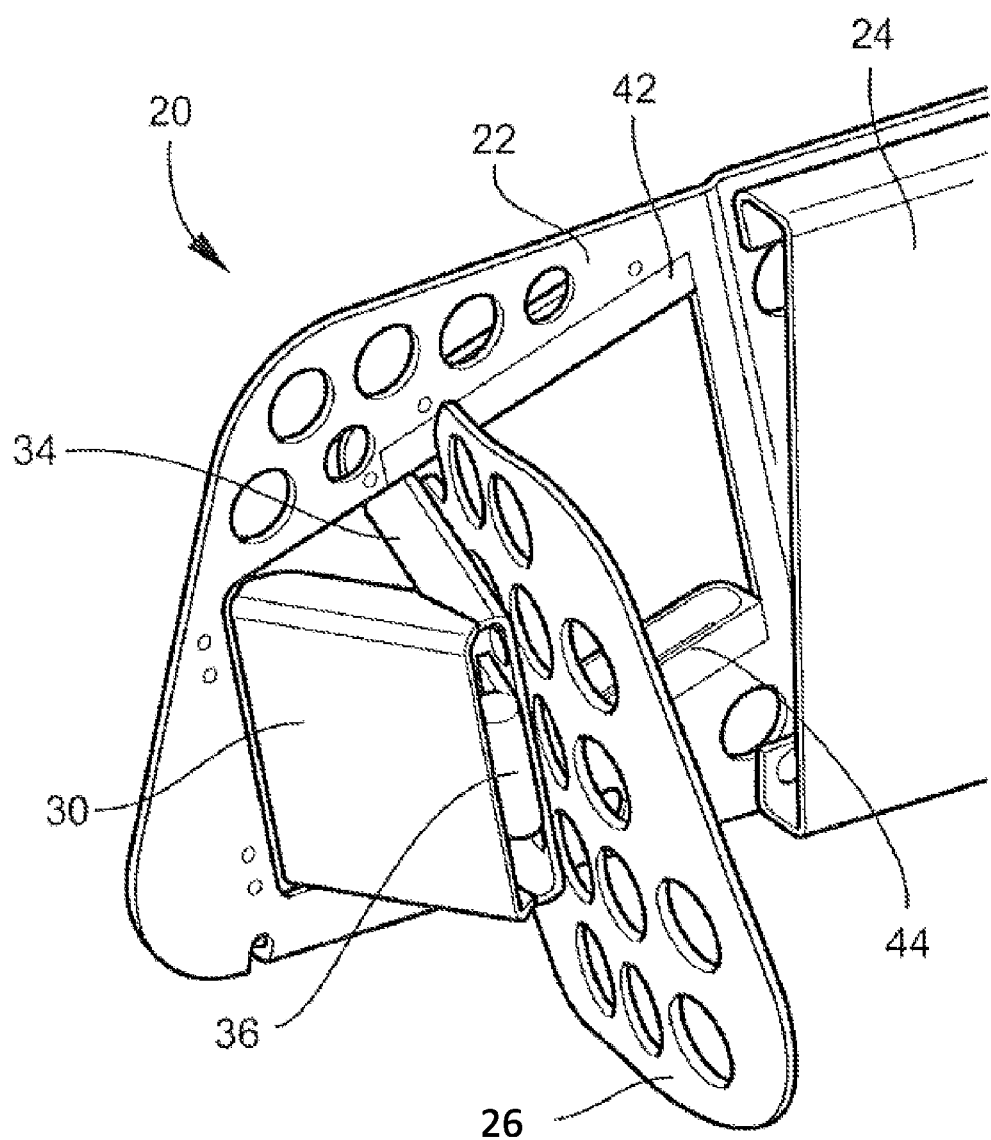
FIG. 6 depicts a perspective view of an exemplary headrest in a deployed position.

FIG. 6 depicts a perspective view of an exemplary headrest in a deployed position. The headrest 20 includes the mounting base 22. The mounting base 22 is fixedly coupled to the central support 24. The mounting base 22 is hingedly coupled to the support arm 30. The support arm 30 is fixedly attached to the hinge 36. The hinge 36 couples to the slide hinge arm 34, mounted for hinged movement relative to the support arm 30. The slide hinge arm 34 is coupled to the headrest wing 26. The slide hinge arm 34 is slidably engaged with the upper slide rail 42. The slide hinge arm 34 is also slidably engaged with the lower slide rail 44.

Figure 7:
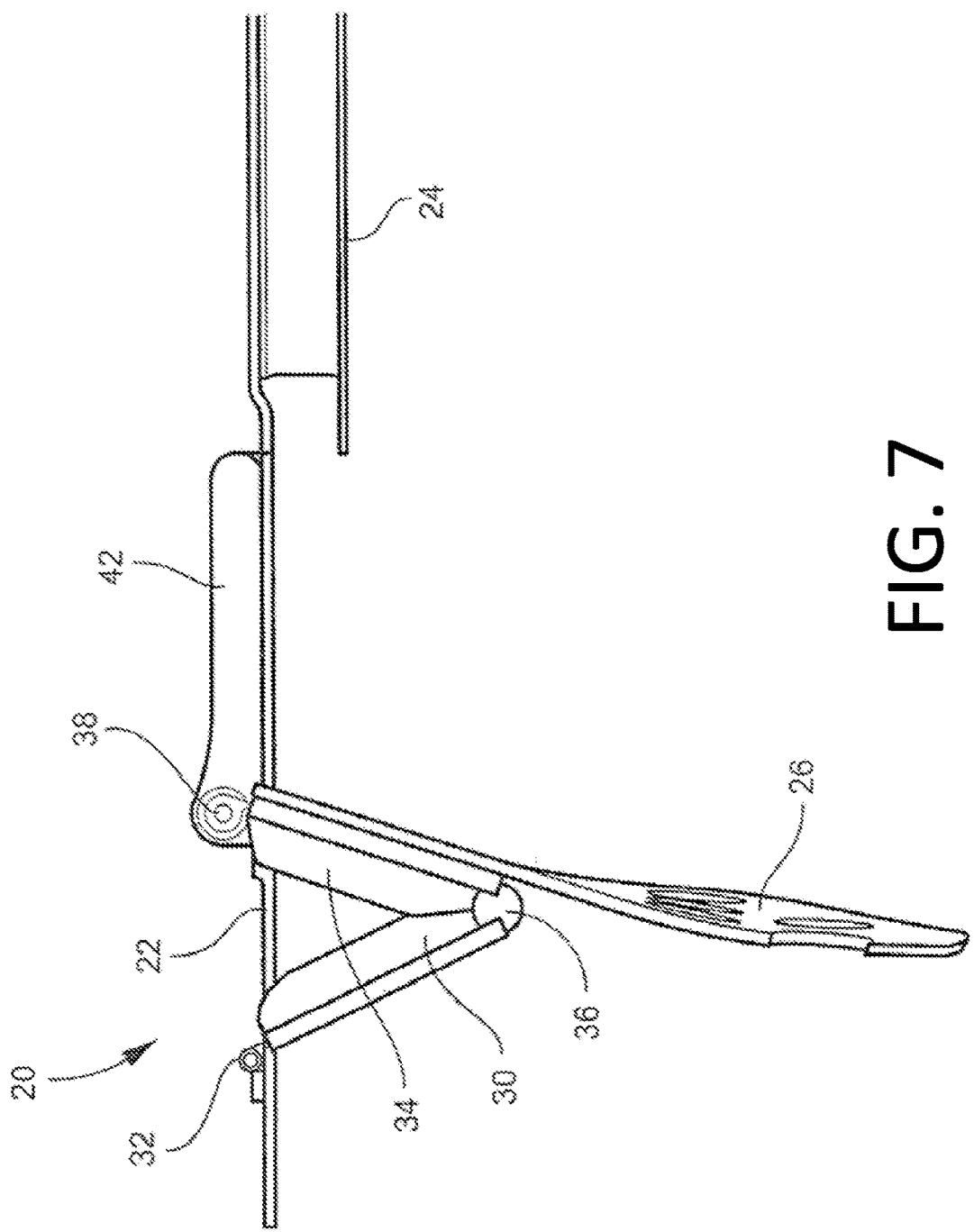
FIG. 7 depicts a top plan view of an exemplary headrest in a deployed position.

FIG. 7 depicts a top view of an exemplary headrest in a deployed position. The headrest 20 includes the central support 24. The central support 24 is fixedly coupled to the mounting base 22. The mounting base 22 is hingedly coupled to the support arm 30 via the hinge 32. The support arm 30 is fixedly attached to the hinge 36. The hinge 36 couples to the slide hinge arm 34, mounted for hinged movement relative to the support arm 30. The slide hinge arm 34 is coupled to the headrest wing 26. The slide hinge arms 34 is rotatably coupled to a roller 38. The roller 38 is slidably engaged with the upper slide rail 42.

In some embodiments, the pair of upper slide rails 42 and 62, and the pair of lower slide rails 44 and 64 may include a detent in the form of a lowered area on the slide rails 42, 44, 62 and 64, as pictured in FIG. 7, reference 42.

Figure 8:
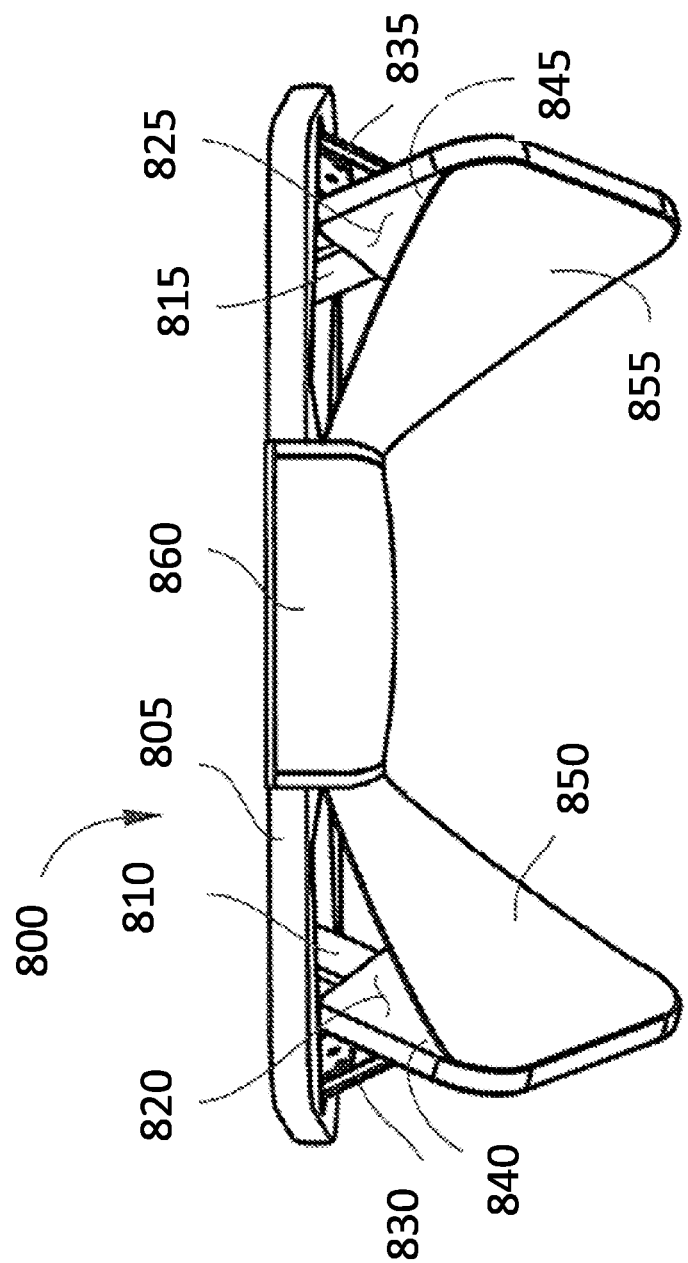
FIG. 8 depicts a front perspective view of an exemplary passenger headrest.

FIG. 8 depicts a front perspective view of an exemplary passenger headrest. A passenger headrest 800 includes a mounting base 805. The mounting base 805 is hingedly coupled to a pair of support arms 830 and 835. The support arms 830 and 835 are hingedly coupled to a pair of articulating arms 810 and 815. The pair of articulating arms 810 and 815 slidably engage the mounting base 805. The pair of articulating arms 810 and 815 are coupled to a pair of wing supports 840 and 845. The pair of wing supports 840 and 845 are coupled to a pair of flexible tongues 850 and 855. The pair of flexible tongues 850 and 855 are coupled to a pair of headrest paddings 820 and 825. The pair of headrest paddings 820 and 825 are coupled to a padded headrest bridge 860.

Figure 9:
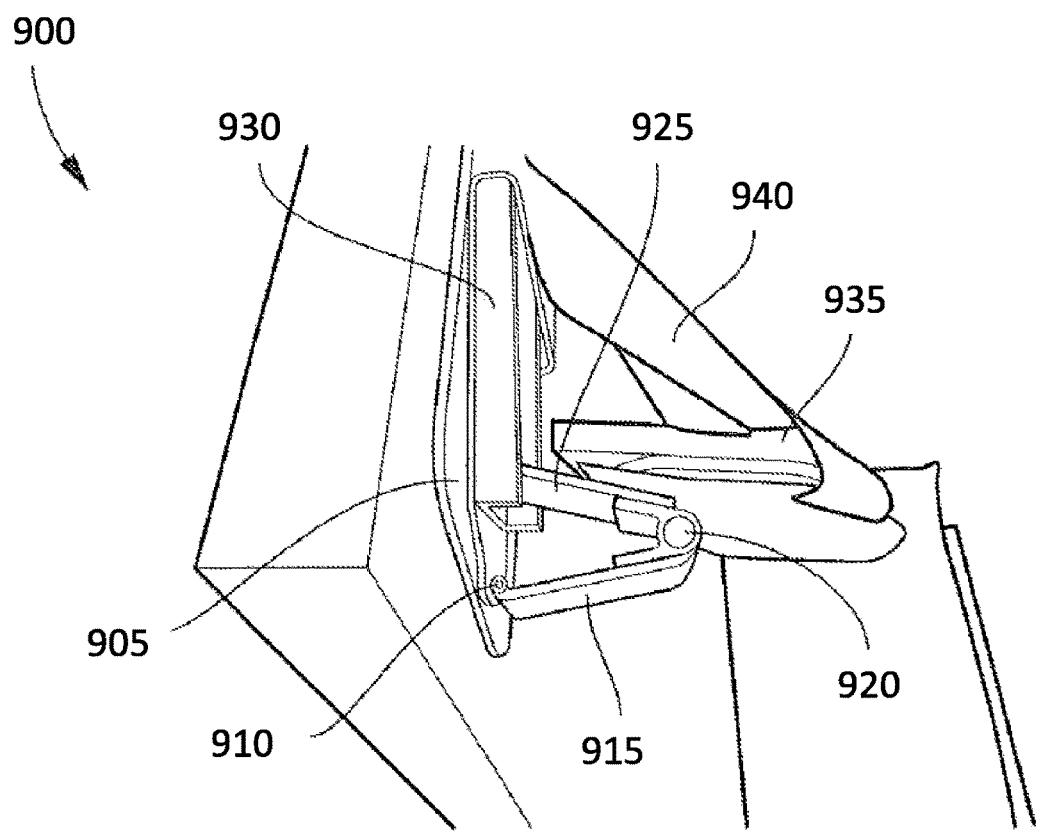
FIG. 9 depicts a fragmentary top perspective view of an exemplary headrest.

FIG. 9 depicts a fragmentary top perspective view of an exemplary headrest. A passenger headrest 900 includes a mounting base 905. The mounting base 905 is fixedly coupled to a hinge 910. The hinge 910 is coupled to an articulating arm 915. The articulating arm 915 is coupled to a hinge 920. The hinge 920 is coupled to an articulating wing support 925. The articulating wing support 925 is slidably coupled to a slider track 930. The articulating wing support 925 is coupled to a wing 935. The wing 935 is coupled to a flexible membrane 940. In some embodiments, the headrest 900 may include the flexible membrane 940 stretched between each wing 935.

Figure 10:
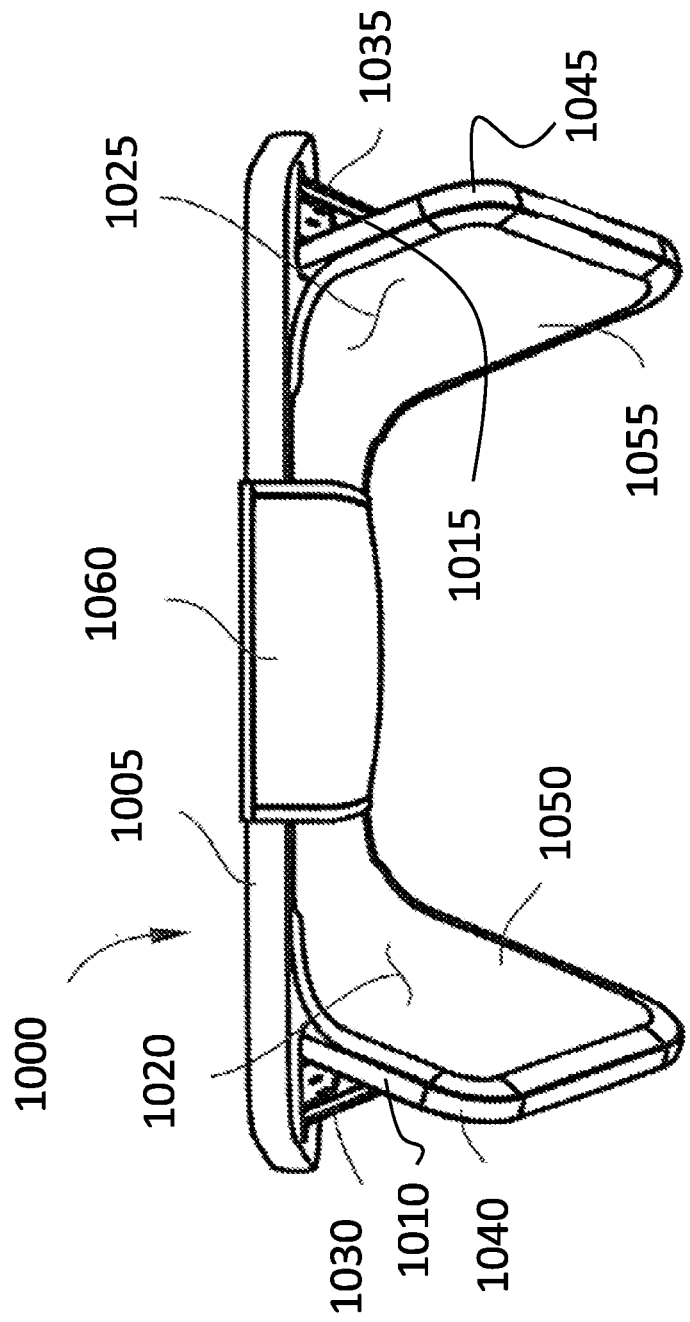
FIG. 10 depicts a front perspective view of an exemplary passenger headrest.

FIG. 10 depicts a front perspective view of an exemplary passenger headrest. A passenger headrest 1000 includes a mounting base 1005. The mounting base 1005 is hingedly coupled to a pair of support arms 1030 and 1035. The pair of support arms 1030 and 1035 are hingedly coupled to a pair of articulating arms 1010 and 1015. The pair of articulating arms 1010 and 1015 slidably engage the mounting base 1005. The pair of articulating arms 1010 and 1015 are coupled to a pair of wing supports 1040 and 1045. The pair of wings supports 1040 and 1045 are coupled to a pair of flexible tongues 1050 and 1055. The pair of flexible tongues 1050 and 1055 are coupled to a pair of headrest paddings 1020 and 1025. The pair of headrest paddings 1020 and 1025 are coupled to a padded headrest bridge 1060.

Figure 11:
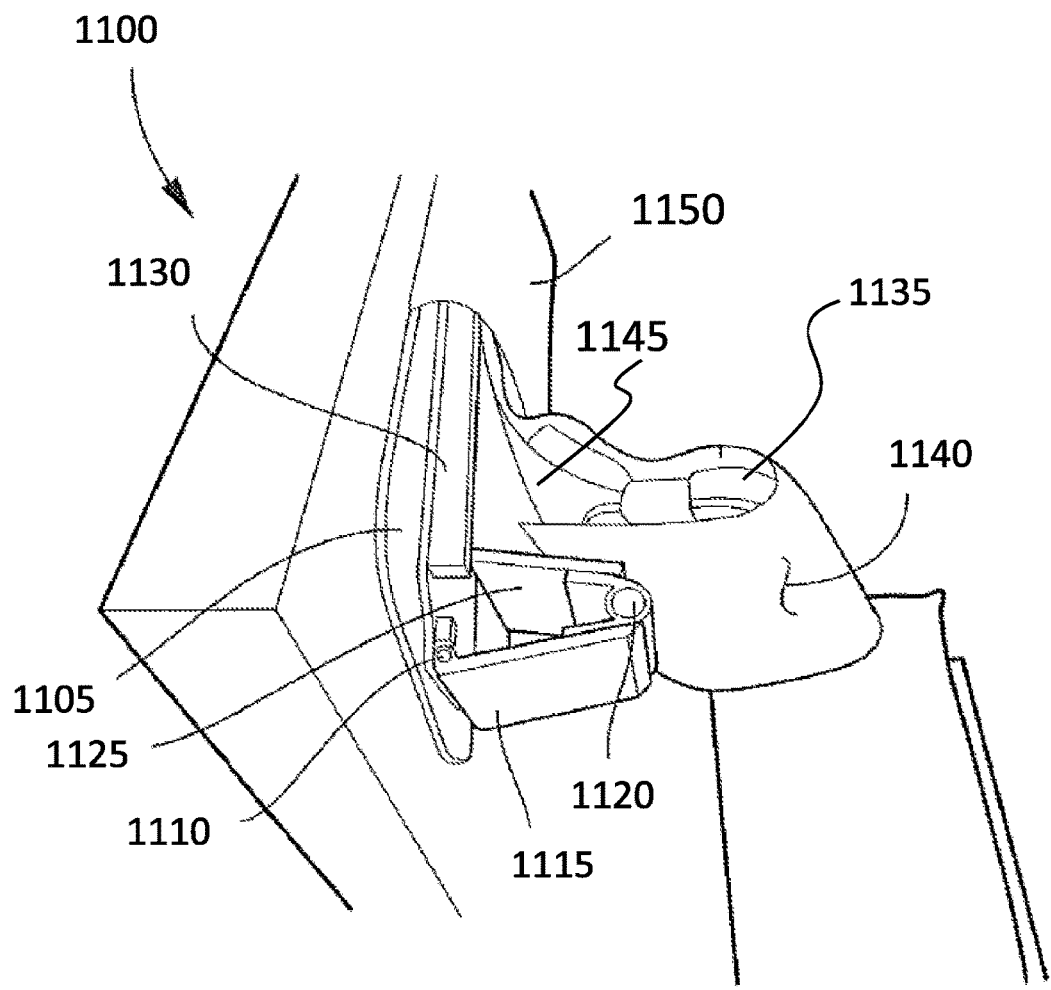
FIG. 11 depicts a fragmentary top perspective view of an exemplary headrest.

FIG. 11 depicts a fragmentary top perspective view of an exemplary headrest. A passenger headrest 1100 includes a mounting base 1105. The mounting base 1105 is fixedly coupled to a hinge 1110. The hinge 1110 is coupled to an articulating arm 1115. The articulating arm 1115 is coupled to a hinge 1120. The hinge 1120 is coupled to an articulating wing support 1125. The articulating wing support 1125 is slidably coupled to a slider track 1130. The articulating wing support 1125 is coupled to a flexible padding fabric 1140. In some embodiments, the flexible padding fabric 1140 may be a disposable fabric. In some embodiments, the flexible padding fabric 1140 may be replaced by the flight crew. The flexible padding fabric 1140 is proximate and supported by a wing cushion 1135. The wing cushion 1135 is coupled to a flexible tongue 1145. The flexible tongue 1145 and the flexible padding fabric 1140 are coupled to a padded headrest bridge 1150. In various examples, the flexible padding fabric 1140 may be described as suitable fabric.

Figure 12A:
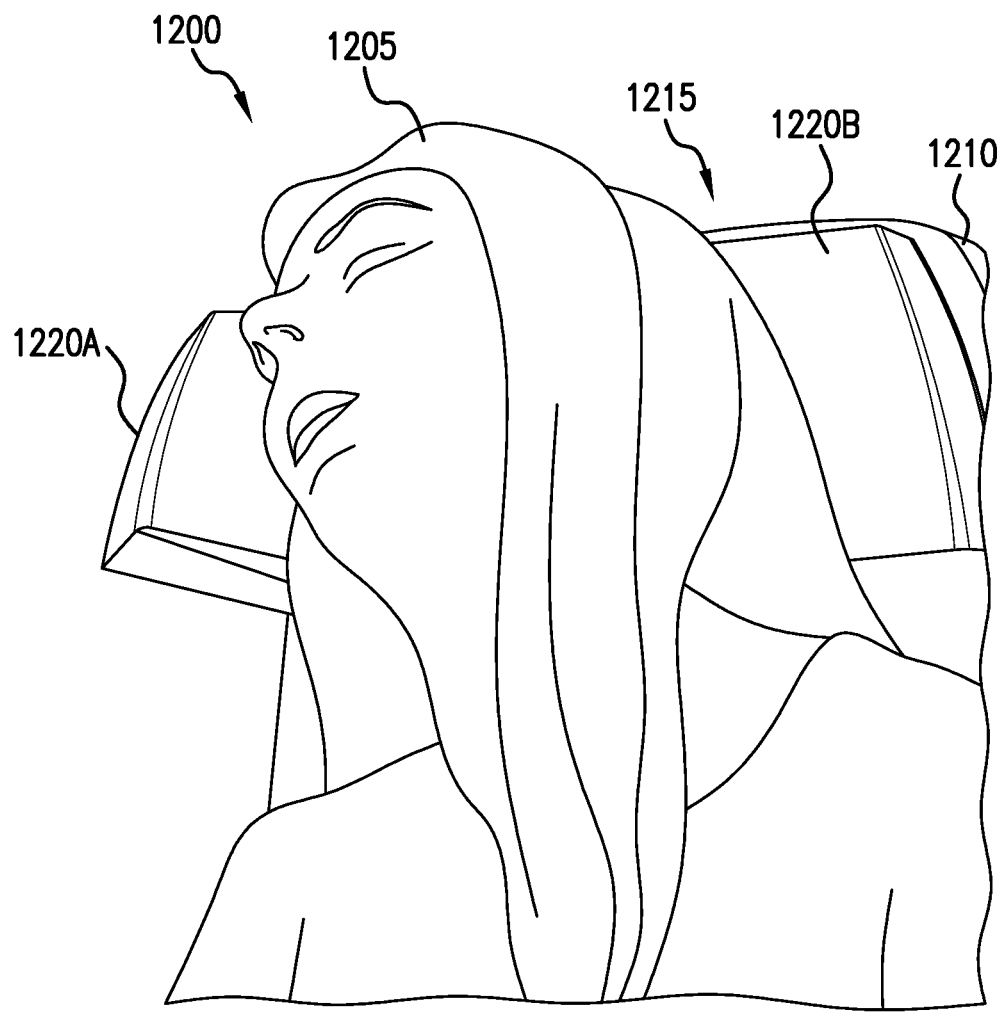
FIG. 12A depicts a perspective view of an exemplary articulating passenger headrest in use by a passenger.

FIG. 12A depicts a perspective view of an exemplary articulating passenger headrest in use by a passenger. A use case scenario 1200 includes a passenger 1205. The passenger 1205 is seated in a passenger seat 1210. The passenger seat 1210 includes an articulating passenger headrest 1215. The passenger 1205 deploys a right articulating wing cushion 1220A, which may provide a head resting pocket for the passenger 1205. A left articulating wing cushion 1220B is in the undeployed state in this use case scenario 1200. In some embodiments, the passenger's head may be supported by a "hammock" formed by the stretch fabric, the fixed head cushion, and the deployed wing cushion.

FIGS. 12B-12E depict the articulating passenger headrest in sequential states of deployment. Only the articulating passenger headrest system components that clarify the deployment states will be referenced and discussed in this subset of drawings.

Figure 12B:
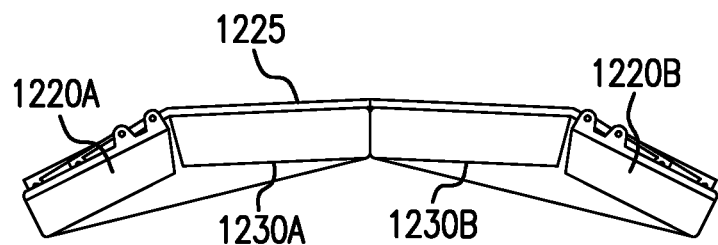
FIG. 12B depicts a plan view of an exemplary articulating passenger headrest shown in a stowed state.

FIG. 12B depicts a top view of an exemplary articulating passenger headrest shown in a stowed state. The articulating passenger headrest system in a stowed state includes the right articulating wing cushion 1220A and the left articulating wing cushion 1220B. The cushions 1220A and 1220B are fixedly coupled to a seat base 1225. The cushions 1220A and 1220B are seated against the seat base 1225 when in this stowed state. The seat base 1225 includes a right fixed head cushion 1230A, and a left fixed head cushion 1230B, fixedly coupled to the seat base 1225.

Figure 12C:
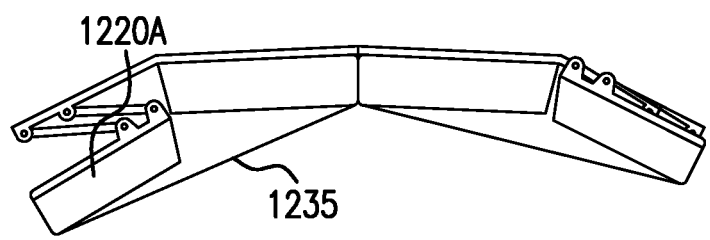
FIG. 12C depicts a plan view of an exemplary articulating passenger headrest shown in an initial mid-deployment state.

FIG. 12C depicts a top view of an exemplary articulating passenger headrest shown in an initial mid-deployment state. The right articulating wing cushion 1220A is fixedly coupled on the outer edge to a headrest material 1235. As the cushion 1220A is set in motion, the translation causes the headrest material 1235 to form a gap between it and the rest of the articulating passenger headrest system.

Figure 12D:
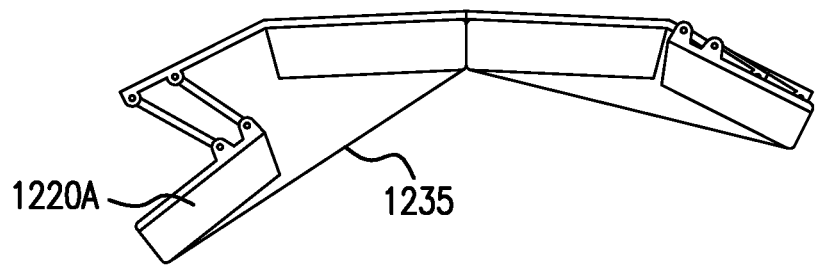
FIG. 12D depicts a plan view of an exemplary articulating passenger headrest shown in a secondary mid-deployment state.

FIG. 12D depicts a top view of an exemplary articulating passenger headrest shown in a secondary mid-deployment state. As the cushion 1220A continues its motion, the additional translation causes the headrest material 1235 to form a larger gap between it and the rest of the articulating passenger headrest system.

Figure 12E:
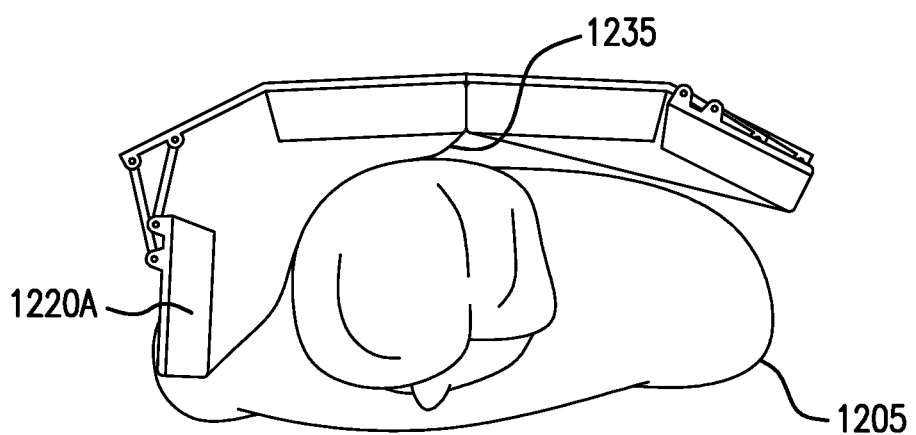
FIG. 12E depicts a plan view of an exemplary articulating passenger headrest shown a final deployment state.

FIG. 12E depicts a top view of an exemplary articulating passenger headrest shown a final deployment state. As the cushion 1220A continues to its final position, fully deployed, the translation begins to pivot counter clock-wise (CCW) as the hinge linkages reach the extent of their travel. The headrest material 1235 is fully gapped from the articulating passenger headrest static structure, providing the passenger 1205 a comfortable pocket to rest his or her head.

Figure 13A:
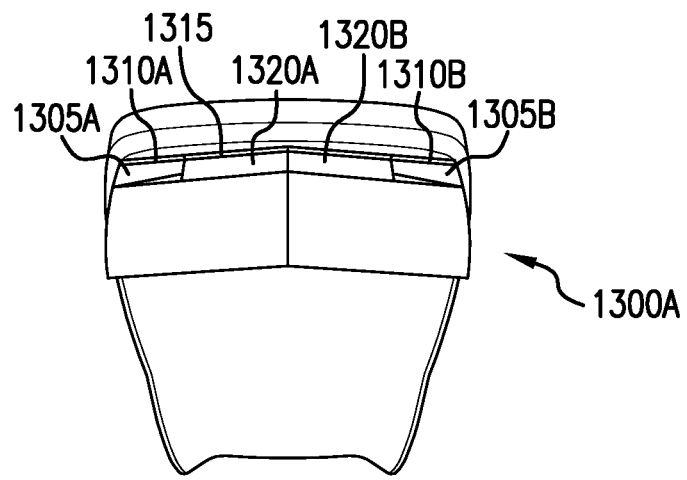
FIG. 13A depicts a front perspective view of an exemplary articulating passenger headrest shown in a stowed state.

FIG. 13A depicts a front perspective view of an exemplary articulating passenger headrest shown in a stowed state. An articulating passenger headrest system 1300A includes a right wing cushion 1305A. The right wing cushion 1305A is hingedly coupled to a right wing hinge base 1310A. The right wing hinge base 1310A is coupled to a central hinge plate 1315 via a right hinged linkage (not shown). The central hinge plate 1315 is fixedly coupled to a right center cushion 1320A and a left center cushion 1320B. The central hinge plate 1315 is also hingedly coupled to a left wing hinge base 1310B via a left hinged linkage (not shown). The left wing hinge base 1310B is fixedly coupled to a left wing cushion 1305B.

Figure 13B:
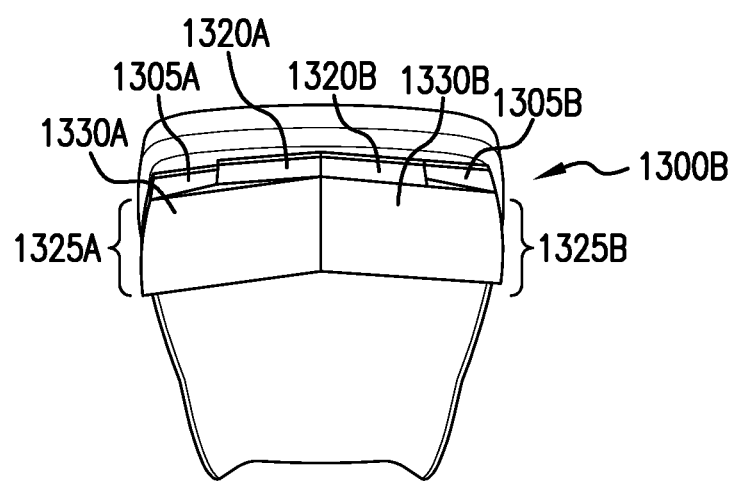
FIG. 13B depicts a front perspective view of an exemplary articulating passenger headrest shown in an initial mid-deployment state.

FIG. 13B depicts a front perspective view of an exemplary articulating passenger headrest shown in an initial mid-deployment state. An articulating passenger headrest system 1300B is similar to the articulating passenger headrest system 1300A, except the right wing cushion 1305A is partially deployed. The right wing cushion 1305A is fixedly coupled on its extreme distal end 1325A, to a hammock material 1330A. The hammock material 1330A is fixedly coupled on its other end between the center cushions 1320A and 1320B. The center cushions 1320A and 1320B also fixedly couple a left hammock material 1330B. The left hammock material 1330B is fixedly coupled to a left wing cushion 1305B on its extreme distal end 1325B.

In some embodiments, the hammock material 1330A and 1330B may be a high return force stretch fabric. In some examples, the hammock material 1330A and 1330B may be cotton which may be economical and disposable. In some embodiments, the hammock material may be formed at least in part of, for example, a synthetic fiber, which may be beneficially stretchable. In some examples, the hammock material may combine elastic material with some other fabric.

Figure 13C:
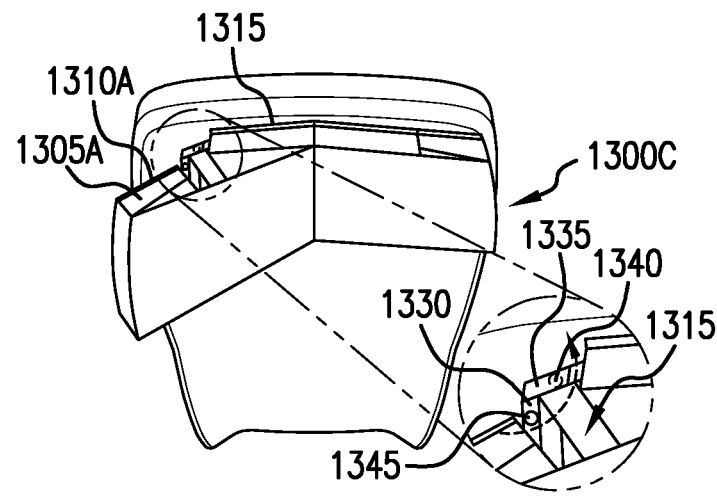
FIG. 13C depicts a front perspective view of an exemplary articulating passenger headrest shown in a secondary mid-deployment state and with an exemplary detent feature.

FIG. 13C depicts a front perspective view of an exemplary articulating passenger headrest shown in a secondary mid-deployment state and with an exemplary detent feature. An articulating passenger headrest system 1300C, includes a right wing cushion 1305A. The right wing cushion 1305A is hingedly coupled to a right wing hinge base 1310A. The right wing hinge plate is coupled to a central hinge plate 1315 via a right hinged linkage 1330. The central hinge plate 1315 is fixedly coupled to a small flange 1335 shown in the detail inset. The small flange 1335 includes a detent indentation 1340. The right hinged linkage 1330 includes a detent bump 1345. The detent bump 1345 may cooperate with the detent indentation 1340 and may hold the wing cushion 1305A in the stowed position. In some embodiments, the indentation 1340 and bump 1345 may be in swapped positions.

In some examples, detents may be incorporated into the linkages and hinge plates to cause the wings to snap into a stowed position. In some embodiments, one or more torsion springs may be mounted about the hinges to bias the wings into a stowed position. In some examples, additional detents may be used and employed in the hinge and linkage interfaces.

Figure 13D:
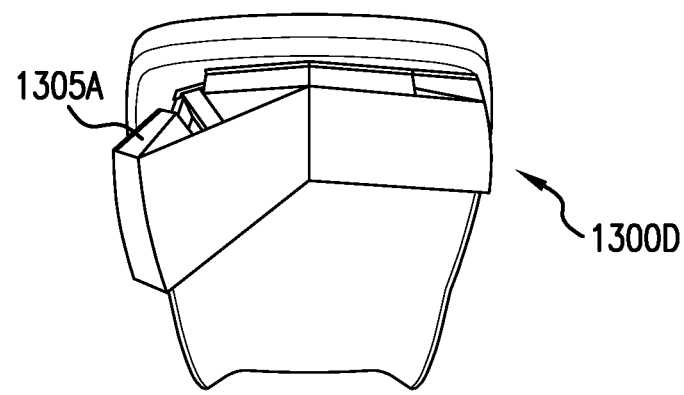
FIG. 13D depicts a front perspective view of an exemplary articulating passenger headrest shown a final deployment state.

FIG. 13D depicts a front perspective view of an exemplary articulating passenger headrest shown a final deployment state. An articulating passenger headrest system 1300D includes a right wing cushion 1305A. The right wing cushion 1305A is shown in the fully deployed state.

Figure 14A:
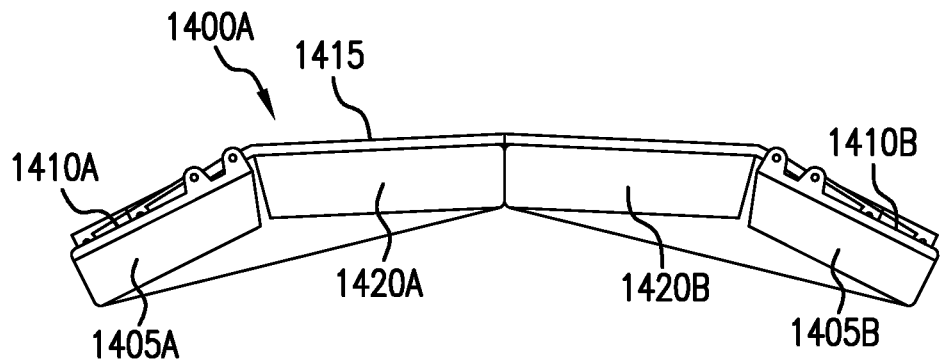
FIG. 14A depicts a plan view of an exemplary articulating passenger headrest shown in a stowed state.

FIG. 14A depicts a top view of an exemplary articulating passenger headrest shown in a stowed state. An articulating passenger headrest system 1400A includes a right wing cushion 1405A. The right wing cushion 1405A is fixedly coupled to a right wing hinge plate 1410A. The right wing hinge plate 1410A is coupled to a central hinge plate 1415 via a right hinged linkage. The central hinge plate 1415 is fixedly coupled to a right center cushion 1420A and a left center cushion 1420B. The central hinge plate 1415 is also hingedly coupled to a left wing hinge plate 1410B via a left hinged linkage. The left wing hinge plate 1410B is fixedly coupled to a left wing cushion 1405B. In an illustrative example, when in the stowed state, the left and right hinged linkages may collapse and stow within an envelope within the left and right wing hinge plates, 1410A and 1410B.

Figure 14B:
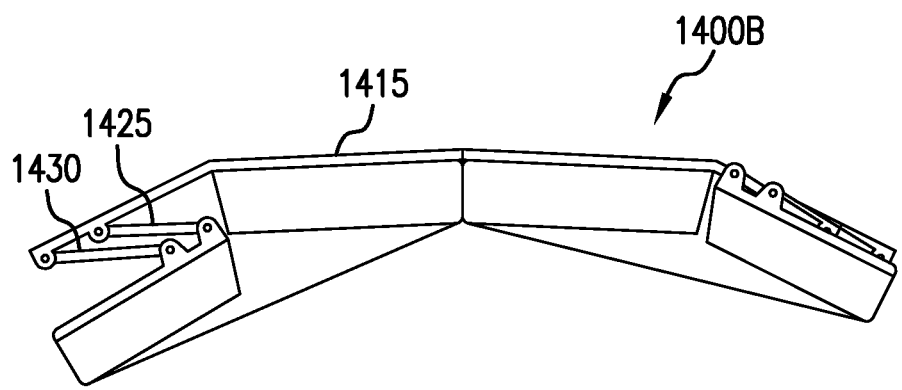
FIG. 14B depicts a plan view of an exemplary articulating passenger headrest shown in an initial mid-deployment state.

FIG. 14B depicts a plan view of an exemplary articulating passenger headrest shown in an initial mid-deployment state. An articulating passenger headrest system 1400B includes the central hinge plate 1415. The central hinge plate 1415 is hingedly coupled to a proximal linkage arm 1425 and a distal linkage arm 1430. In some embodiments, the proximal linkage arm 1425 and the distal linkage arm 1430 may be different lengths. In some embodiments, the proximal linkage arm 1425 and the distal linkage arm 1430 may provide an advantageous motion of the coupled cushion surface, laterally translating it toward the user as the resting surface rotates around a general vertical axis as it continues to face the user.

Figure 14C:
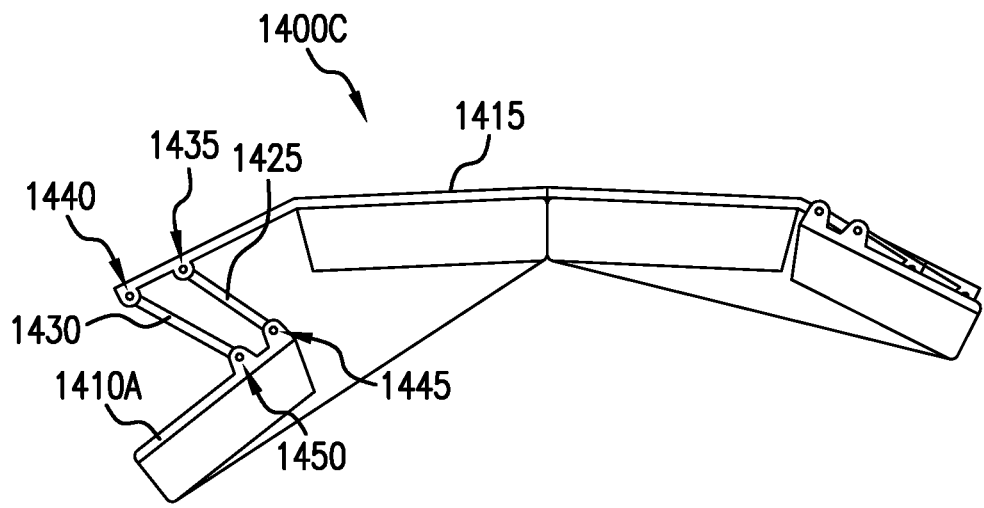
FIG. 14C depicts a plan view of an exemplary articulating passenger headrest shown in a secondary mid-deployment state and with an exemplary detent feature.

FIG. 14C depicts a plan view of an exemplary articulating passenger headrest shown in a secondary mid-deployment state and with an exemplary detent feature. An articulating passenger headrest system 1400C includes the central hinge plate 1415. The central hinge plate 1415 includes a proximal hinge 1435. The proximal hinge 1435 is hingedly coupled to the proximal linkage arm 1425. The proximal linkage arm 1425 is hingedly coupled to an inner hinge 1445. The inner hinge 1445 is hingedly coupled to the right wing hinge plate 1410A. The central hinge plate 1415 includes a distal hinge 1440. The distal hinge 1440 is hingedly coupled to a distal linkage arm 1430. The distal linkage arm 1430 is hingedly coupled to an outer hinge 1450. The outer hinge 1450 is hingedly coupled to the right wing hinge plate 1410A. In some embodiments, additional hinges and linkages may be employed.

Figure 14D:
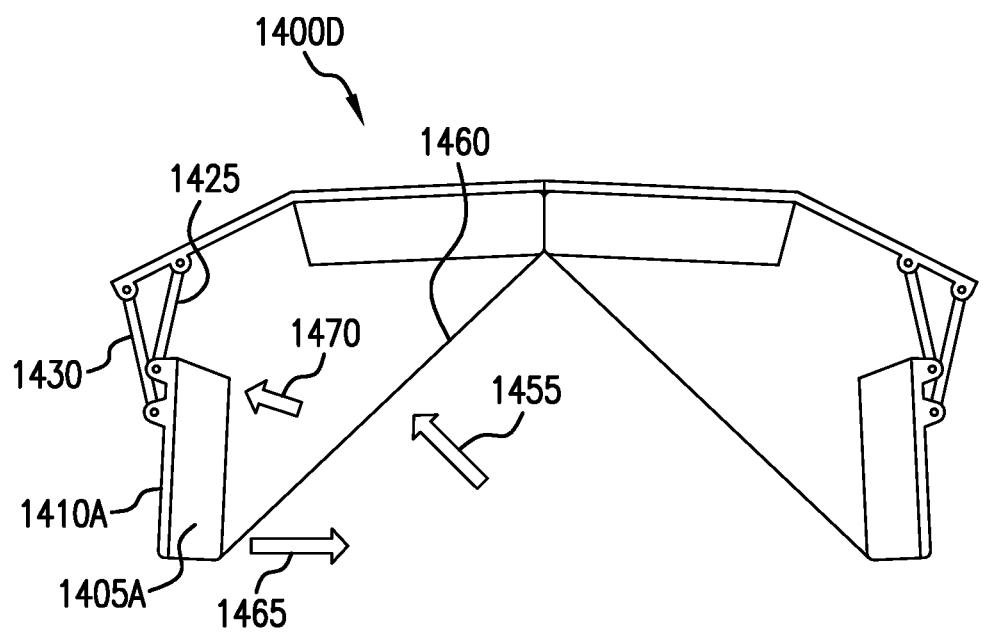
FIG. 14D depicts a plan view of an exemplary articulating passenger headrest shown a final deployment state.

FIG. 14D depicts a plan view of an exemplary articulating passenger headrest shown a final deployment state. An articulating passenger headrest system 1400D is in a final deployment state with the right wing cushion 1405A, coupled to the right wing hinge plate 1410A, locked into position. The right wing cushion 1405A is fixedly coupled to a flexible fabric 1460. When a passenger's head force 1455 presses on the surface of the flexible fabric 1460, an inward lateral force 1465 is applied to the right wing cushion 1405A. The inward lateral force 1465 pivots the right wing cushion 1405A about the distal linkage arm 1430. The distal linkage arm 1430 pivot, moves the proximal linkage arm 1425 counter clockwise (CCW). The CCW motion continues until the proximal linkage arm 1425 stops the rotation, locking the right wing cushion 1405A in place.

In an illustrative example, the linkage arms 1425, 1430 described in relation to FIGS. 14A-14D may articulate the wing base member from a stowed position to a deployed position.

Figure 15A:
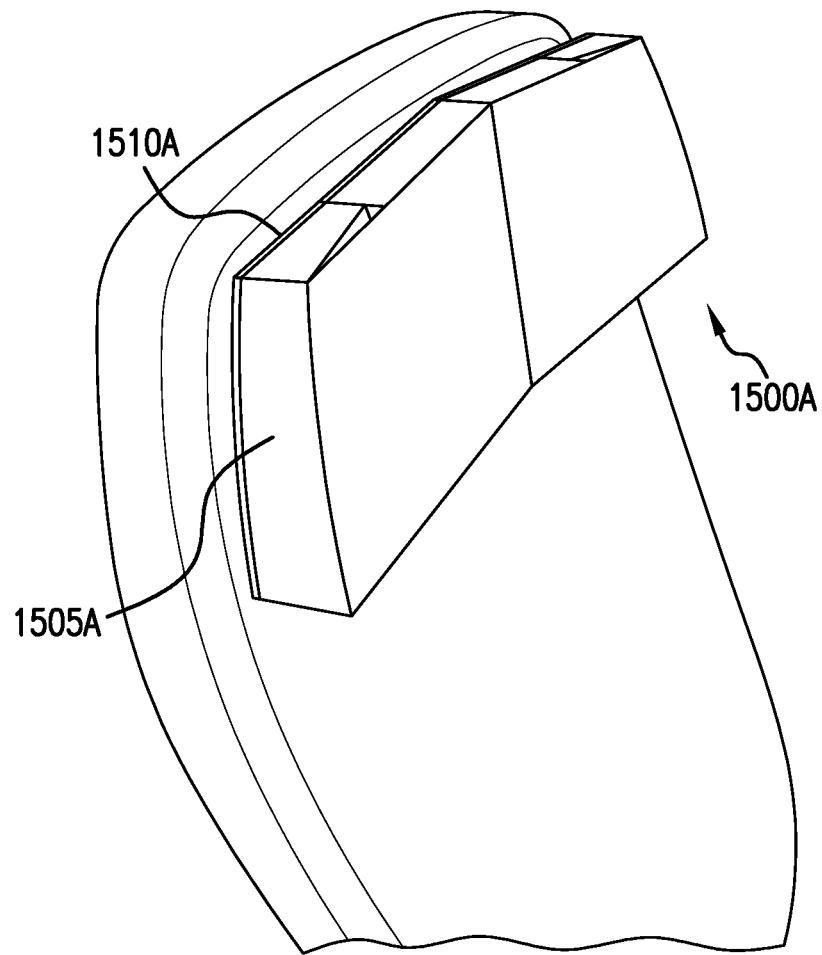
FIG. 15A depicts a side perspective view of an exemplary articulating passenger headrest shown in a stowed state.

FIG. 15A depicts a side perspective view of an exemplary articulating passenger headrest shown in a stowed state. An articulating passenger headrest system 1500A includes a right wing 1505A. The right wing 1505A employs a cushion with a trapezoidal cross section 1510A. In some examples, the cushion material may include, for example, a dense open-cell polyurethane foam, and may provide substantial head support. In some examples, the cushion material may include a soft closed-cell polyurethane foam, and may provide substantial head comfort. In an exemplary embodiment, the cushion material may include memory foam, and may provide both substantial head support and substantial comfort.

Figure 15B:
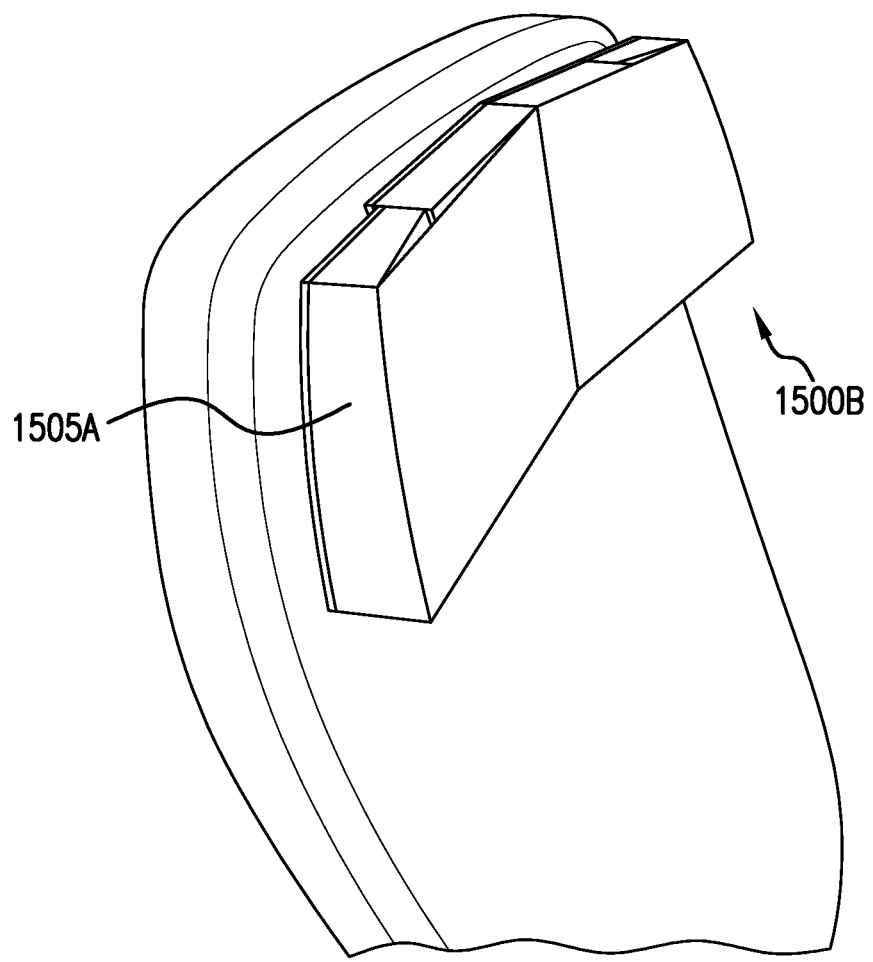
FIG. 15B depicts a side perspective view of an exemplary articulating passenger headrest shown in an initial mid-deployment state.

FIG. 15B depicts a side perspective view of an exemplary articulating passenger headrest shown in an initial mid-deployment state. An articulating passenger headrest system 1500B is shown to detail an illustrative example of the deployment of the right wing 1505A.

Figure 15C:
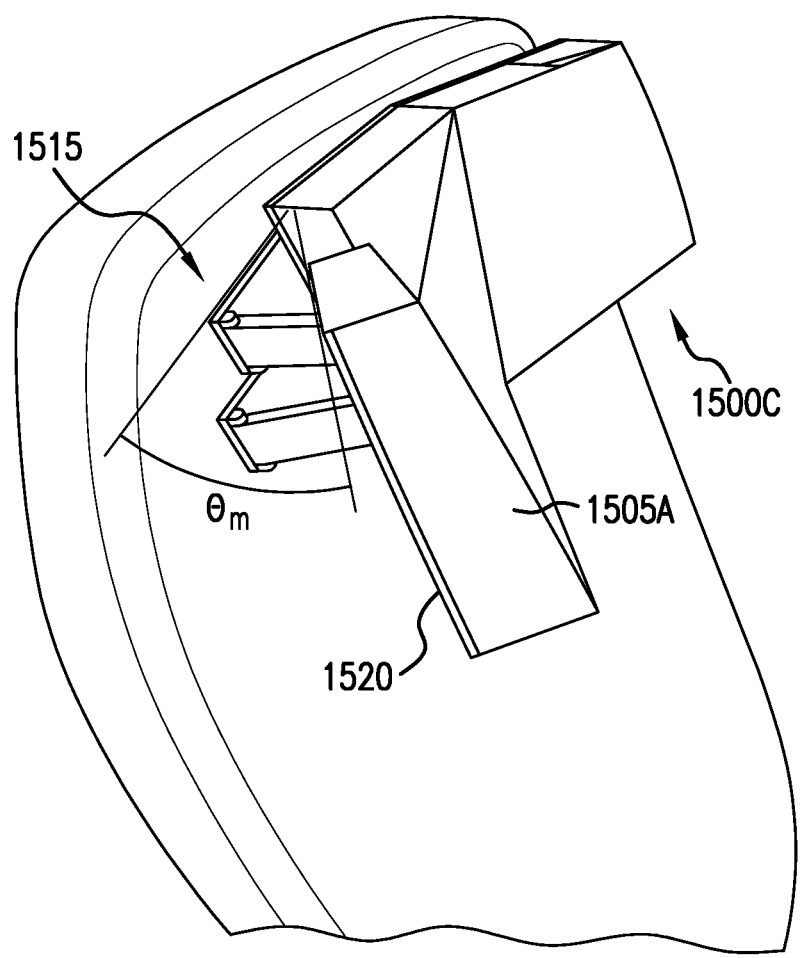
FIG. 15C depicts a side perspective view of an exemplary articulating passenger headrest shown in a secondary mid-deployment state.

FIG. 15C depicts a side perspective view of an exemplary articulating passenger headrest shown in a secondary mid-deployment state. An articulating passenger headrest system 1500C is in a mid-deployment state just before the right wing 1505A locks into position. In some embodiments, a deployment angle $\Theta_m$ may be defined as the angle between (a) the plane in which the seatback 1515 resides and (b) the plane in which the wing backing support 1520 resides.

In some embodiments, the deployment angle may be between about 45-80 degrees, for example, about 45°, 50°, 55°, 60°, 65°, 70°, 75° or about 80°. In some examples, the deployment angle may be about 45 to 60 degrees, for example, about 45°, 50°, 55°, or up to 60°. In these embodiments, a passenger may advantageously have a wider range of motion for the head while being supported by the hammock. In some examples, a taller or larger framed person may be more comfortable with a greater lateral extension of the hammock in the deployed mode.

In some embodiments, the deployment angle may be between 60 and 80 degrees, for example, about 65°, 70°, 75°, or about 80°. In some examples, the deployment angle may be beneficially support a smaller passenger comfortably supported by the hammock. A child or an adult with a chiropractic condition of the neck, for example, may benefit from a more restricted range of motion while being supported by the hammock in the deployed mode.

In some examples, the wings may articulate into a deployment angle of about 60 degrees, which may advantageously support a typical passenger's head in a position which is rotated less than about 30 degrees from a forward, neutral-spine head alignment.

Figure 15D:
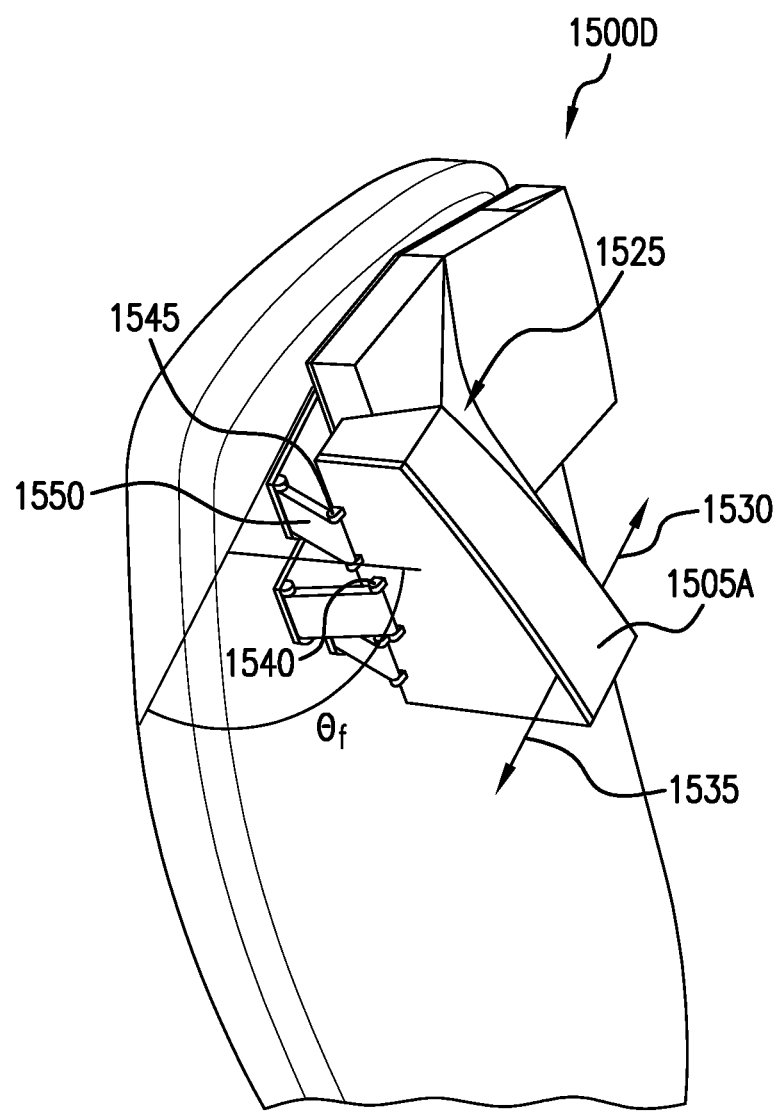
FIG. 15D depicts a side perspective view of an exemplary articulating passenger headrest shown in a final deployment state.

FIG. 15D depicts a side perspective view of an exemplary articulating passenger headrest shown in a final deployment state. An articulating passenger headrest system 1500D is in a final deployment state with the right wing 1505A locked into position. The wing 1505A is fixedly coupled to a hammock material 1525. When a passenger's head is pressing on the surface of the hammock material 1525, an inward lateral force 1530 is applied to the wing 1505A. The inward lateral force 1530 pivots the wing 1505A about an outward hinge 1540. The outward hinge 1540 pivot moves an inward hinge 1545 counter clockwise (CCW). The CCW motion continues until the inward hinge 1545 reaches the extent of the length of a proximal linkage 1550, locking the wing 1505A in place. When the wing 1505A receives an outward lateral force 1535 applied as shown in FIG. 15D, the wing 1505A pivots about the outward hinge 1540. The outward hinge 1540 pivot moves the inward hinge 1545 clockwise (CW). The CW motion continues until the inward hinge 1545 begins to pull the outward hinge 1540 toward the center of the articulating passenger headrest 1500D, and articulates the wing 1505A back into the undeployed or stowed position.

In an illustrative example, the linkages may provide a natural detent effect. The wings may lock into the deployed position by operation of the unequal length linkages. Upon application of a normal force on the distal (far) end of the wing, the wing may "pop" out of the deployed position and may begin articulating back to the undeployed position.

In an illustrative example, the linkages of FIGS. 15A-15D articulate the wing base member from a stowed position to a deployed position.

Figure 16A:
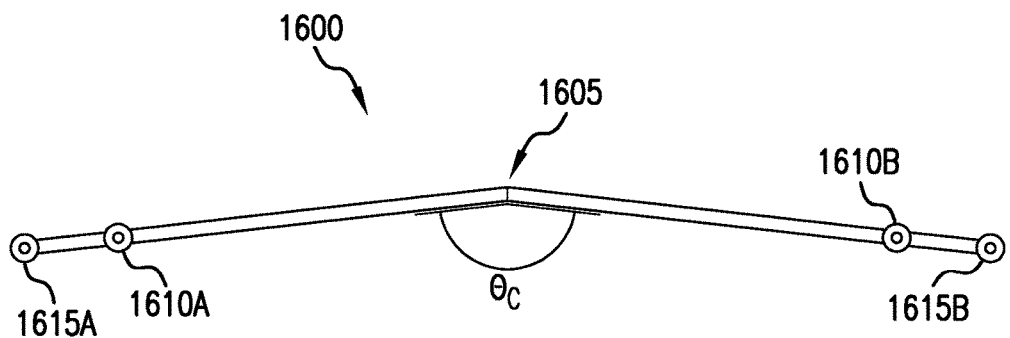
FIG. 16A depicts a plan view of an exemplary articulating passenger headrest central hinge base.

FIG. 16A depicts a plan view of an exemplary articulating passenger headrest central hinge base. An articulating passenger headrest central hinge base 1600 includes a unitary, substantially rigid bi-planar surface with a vertical bend 1605 extending longitudinally along the centerline. In some embodiments, the bend 1605 may advantageously provide a low complexity contour to come closer to matching the contour of the seat to which the central hinge base 1600 mounts. In some examples, the bend 1605 may be incorporated as two shallower bends with a plane in between, making the central hinge base 1600, tri-planar. In some examples, the bend 1605 may be at substantially zero ($\Theta_c$=180°), making the entire central hinge base 1600, substantially co-planar.

The central hinge base 1600 includes a right top hinge 1610A, a right middle hinge 1615A and a right bottom hinge (hidden). The central hinge base 1600 also includes a left top hinge 1610B, a left middle hinge 1615B and a left bottom hinge (hidden).

Figure 16B:
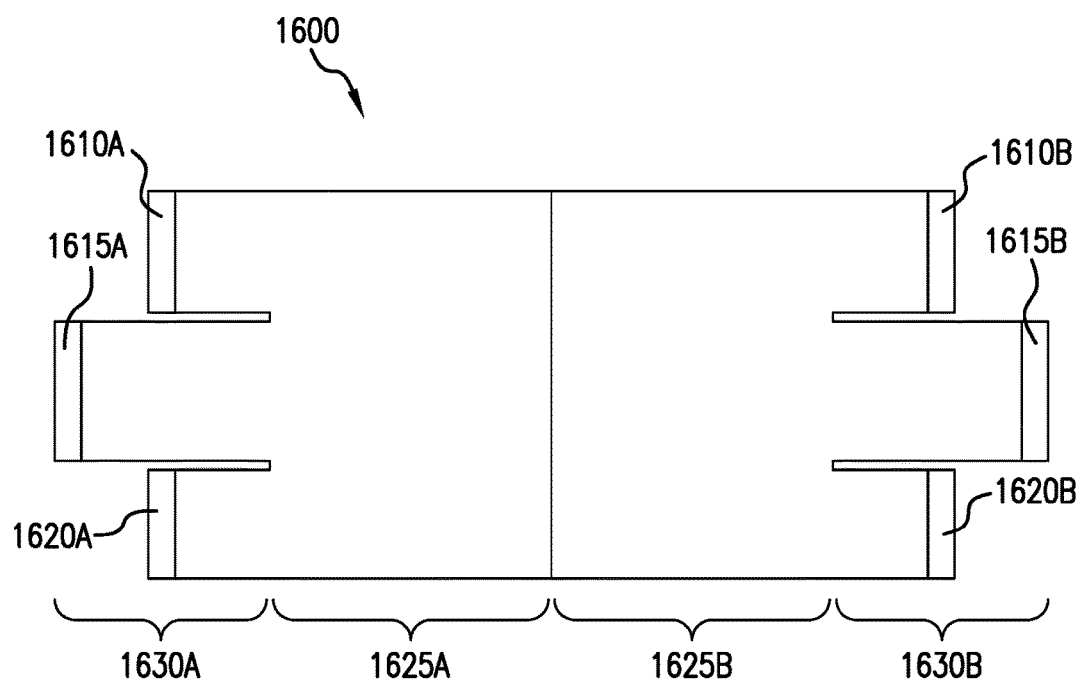
FIG. 16B depicts a front elevation view of an exemplary articulating passenger headrest central hinge base.

FIG. 16B depicts a front elevation view of an exemplary articulating passenger headrest central hinge base of FIG. 16A. The central hinge base 1600 is unitary and includes a right body section 1625A. The right body section extends distally to a right finger section 1630A. The finger section 1630A includes 3 fingers coupled to 3 hinges: the right top hinge 1610A, the right middle hinge 1615A and the right bottom hinge 1620A. The unitary central hinge base 1600 includes a left body section 1625B. The left body section 1625B extends distally to a left finger section 1630B. The finger section 1630B includes 3 fingers coupled to 3 hinges: the left top hinge 1610B, the left middle hinge 1615B and the left bottom hinge 1620B.

Figure 17:
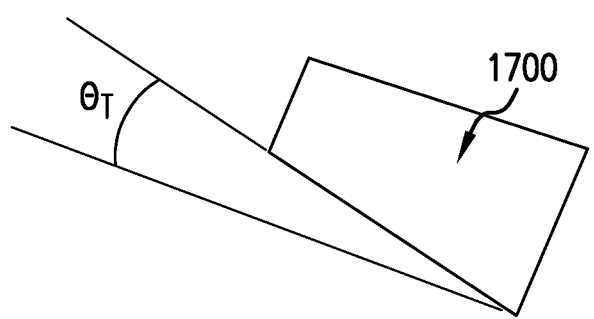
FIG. 17 depicts plan view of an exemplary articulating passenger headrest wing cushion.

FIG. 17 depicts plan view of an exemplary articulating passenger headrest wing cushion. A wing cushion 1700 shown from a top view, includes a taper angle $\Theta_T$. The taper, forming a trapezoidal cross section of the wing cushion, may advantageously improve a user's comfort by removing the high areas in the head resting surface. In some embodiments, the taper angle $\Theta_T$ may be from 2-20 degrees, 3-17 degrees, 4-16 degrees, 5-15 degrees, 6-14 degrees, 7-13 degrees, 8-12 degrees, 9-11 degrees or about 10 degrees.

Figure 18:
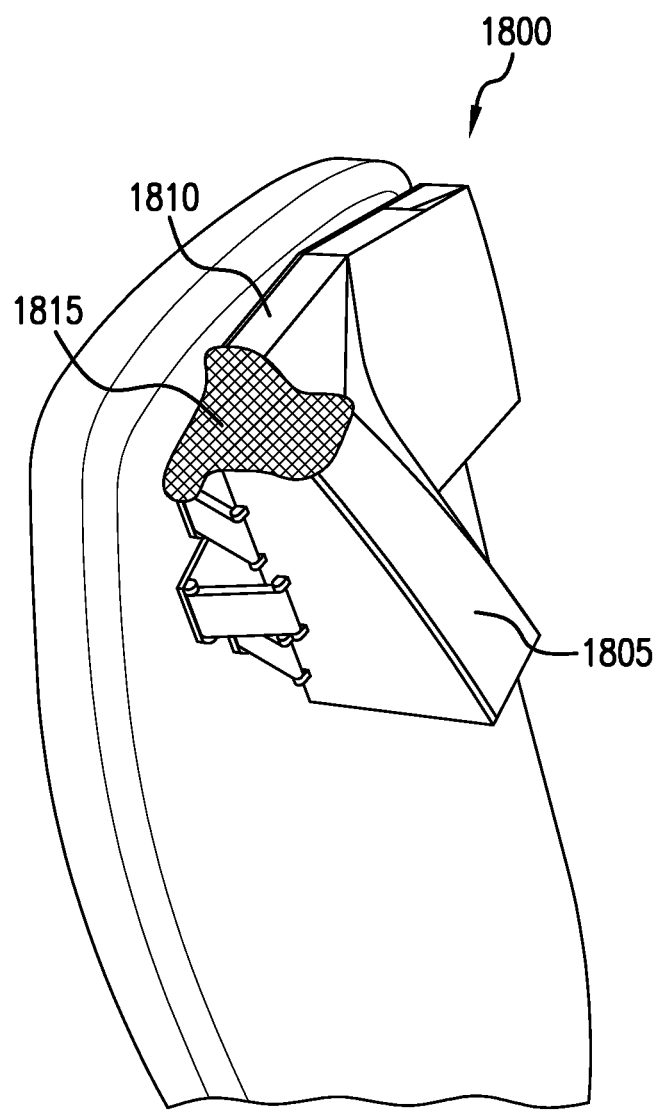
FIG. 18 depicts a perspective view of an exemplary articulating passenger headrest with an attached pinch-point guard; and, FIG. 19 depicts a perspective view of an exemplary articulating passenger headrest with an integrated audio transducer.

FIG. 18 depicts a perspective view of an exemplary articulating passenger headrest with an attached pinch-point guard. An articulating passenger headrest system 1800 includes an articulating wing 1805. The articulating wing 1805 is hingedly coupled to a non-articulating center pad 1810. The gap between the center pad 1810 and the wing 1805 are covered with a pinch-point guard 1815. The pinch-point guard 1815 may include elastic, around its perimeter, for example, to shrink in size as the gap decreases. The pinch-point guard 1815 may include an attachment method to attach to the center pad 1810 and the wing 1805. The attachment method may be hook and loop, for example, which may provide quick removal. In some embodiments, the attachment method may be snaps which may advantageously provide quick removal with positive locating. The attachment method may be elastic hugging which may advantageously allow the wing 1805 to move more freely. The pinch-point guard 1815 may reduce accessibility to a pinch point, which may advantageously guard fingers and clothing for example, from entering a gap that may damage clothing or injure passengers.

Figure 19:
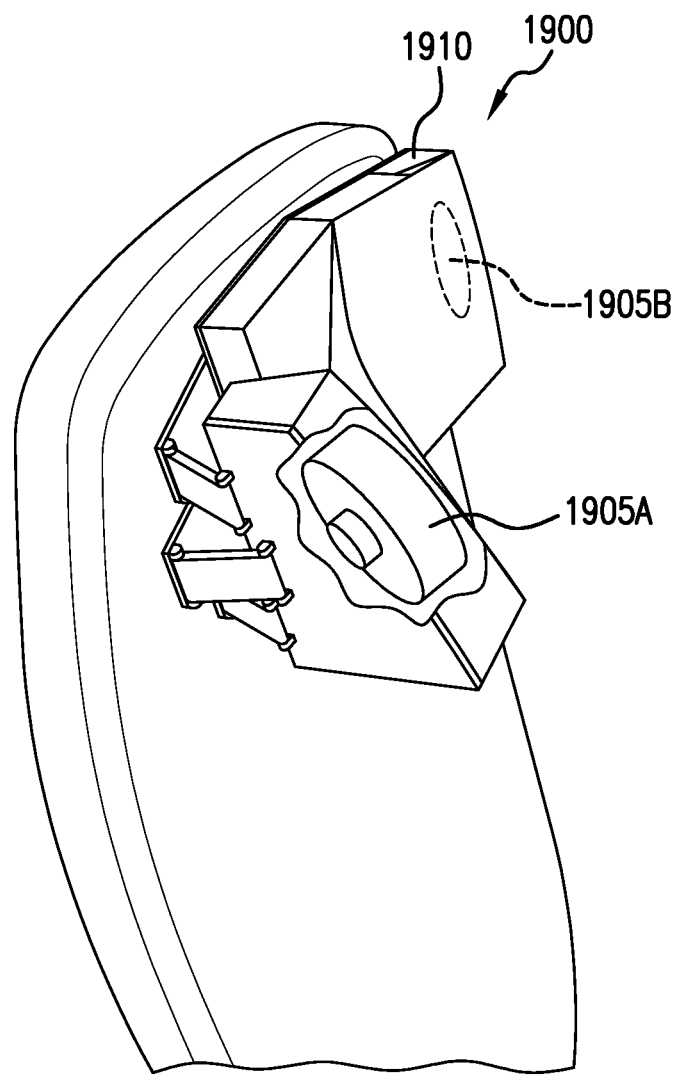

FIG. 19 depicts a perspective view of an exemplary articulating passenger headrest with an integrated audio transducer. An articulating passenger headrest system 1900 includes a left audio transducer 1905B. The left audio transducer 1905B, is integrated within an articulating sleep support cushion 1910. The articulating passenger headrest system 1900 includes a right audio transducer 1905A, integrated into the other side of the articulating passenger headrest system 1900. In some embodiments, the audio transducers may connect to the transport vehicle's sound system.

In an illustrative example, the articulating passenger headrest may include a Bluetooth receiver and an audio amplifier. Using the Bluetooth receiver, the passenger may advantageously pair (connect wirelessly) a personal device with the articulating passenger headrest, to listen to personal music for example. In some examples, the articulating passenger headrest may provide a charging output, such as a USB port to allow a passenger to charge a personal electronic device.

Although various embodiments have been described with reference to the figures, other embodiments are possible, for example some embodiments may not employ the flexible fabric, making the head resting surfaces a direct contact with the side wings. In some examples, the flexible fabric may be adhered to the stationary center cushion.

In some embodiments, the hinging and sliding mechanism may facilitate support for a passenger's head. In some embodiments, a passenger may be provided comfort from the side wings of the headrests. In some embodiments, the side wings of the headrests may be larger and longer, or may move further outwards into the deployed position. In an illustrative example headrests of varying size may provide increased angular support to a passenger's head. In some examples, headrests may be employed in applications other than economy aircraft seats where improved comfort may be desirable, but where the headrest may be required to fit within in a shallow depth. In some examples, the headrests may be mounted on a rotating base plate, with a feature to lock it at different angles, which may provide a range of "angle of support" to the side of the head.

In some examples, headrests may offer lift and lower height adjustment to permit size accommodation for passengers of differing heights, and hinged side wings on the left and right sides to provide head support. Some headrests may tilt forward to support a passenger's head in a reclined position.

In some embodiments, the degree of headrest support may be constrained by three elements: the width of the side wings of the headrest, the distance between the hinges on the side wings, and the total width of the seat back, which may be defined by the fit to the cabin sidewall. In some embodiments, the headrest may offer, for example, about a 30% increase in the side wing length. In some embodiments, the headrest may offer, for example, about a 4% increase in the angle of the side wings in relation to the mounting base. In some embodiments, the headrest may offer, for example, about a 30% increase in the side wings forward extension, when deployed. In an illustrative example, a passenger with chiropractic care history may advantageously be provided more neck support.

In some examples, the gap between the center headrest cushions may be adapted to receive the flexible fabric. For example, a pin or post may be received near the aft portion of the gap at or near the mounting base.

In some embodiments, one or more torsion springs may be mounted within the hinges of the articulating passenger headrest to bias the wings into a stowed position. In an illustrative example, the headrest assembly may remain in the deployed position until a normal, outward force on the distal end of the wing may be applied, at which time the articulating passenger headrest may articulate one or both wings into the stowed position.

In some embodiments, one or more torsion springs may be mounted within the hinges of the articulating passenger headrest to bias the wings into a deployed position. In an illustrative example, the headrest assembly may remain in the stowed position until force, normal and away from the passenger seat, on the distal end of the wing may be applied, at which time the articulating passenger headrest may articulate one or both wings into the deployed position.

In some exemplary embodiments, the hammock material may be flush with the support cushions when the articulating passenger headrest is in the stowed state. In some examples, the hammock material may form a gap to the support cushions when in the stowed state.

The wings may be covered by a flexible fabric. The flexible fabric may include fibers and/or weave designed for elasticity such that the flexible fabric regains its shape after stretching. The flexible fabric, for example, may be designed to stretch in at least one direction (e.g., to stretch downward and around the head of the passenger with the weight of the passenger's head). In another example, the flexible fabric may be designed to stretch in two directions (e.g., vertically to widen and narrow along the head of the passenger as well as horizontally to drop the head snugly in a hammock position).

In some embodiments, the flexible fabric includes elastic fibers designed to regain their shape upon stretching. Examples of suitable elastic fabrics are described, for example, at least with reference to FIG. 2 in U.S. Patent Pub.

2014/0308865 A1, entitled "Stretchable and Dimensionally Stable Woven Fabric Made from Polytrimethylene Terephthalate based on Core Spun Yarns," filed by Kumar, et al. on Dec. 12, 2012, the entire contents of which is incorporated herein by reference. Examples of suitable elastic fabrics are also described, for example, at least with reference to FIG. 11 in U.S. Patent Pub. 2004/0116027 A1, entitled "High Stretch Recovery Non-Woven Fabric and Process for Preparing," filed by Termonia, et al. on Nov. 21, 2003, the entire contents of which is incorporated herein by reference. The use of high-stretch, high recovery force fabric may retain the wing cushion in the deployed position by pulling inwardly on the distal end of the deployed wing. The use of such fabric may also support the passenger's head, for example, as in a hammock.

In some embodiments, a high stretch, high return force fabric may provide the majority of the force supporting a passenger's head. In some embodiments, the wing cushion and fixed head cushions may provide the majority of the supportive force. In certain embodiments, the flexible fabric "hammock" supports at least 10%, at least 20%, at least 30%, at least 40%, at least 50%, at least 60%, at least 70%, at least 80%, at least 90% or about 100% of the weight of the passenger's head. In this context, the weight of the passenger's head is the sum of the forces exerted by the supporting structures (e.g., the stretch fabric, the fixed head cushion, and the deployed wing cushion) to hold the passenger's head in place and excludes the supportive force provided by the passenger's neck. In other embodiments, the flexible fabric "hammock" supports about 10-70% of the weight of the passenger's head, about 20-60% of the weight of the passenger's head, about 30-40% of the weight of the passenger's head, or about 25-50% of the weight of the passenger's head.

A human head, without support of the neck, weighs on average approximately 11 pounds. In some embodiments, the flexible fabric "hammock" is designed to accept loads of up to 4, 5, 6, 7, 8, 9, 10, 11, 12, 13, 14, or 15 lbs when tested using a cylindrical bar one inch in diameter, positioned at the midpoint of the span of the flexible fabric hammock, perpendicular to the span of the fabric, with a deflection of 1 inch, 2 inch, 3 inch or 4 inches. In a preferred embodiment, the wings are covered with an elastic fabric such as that described in WO 2013090422 A1 or WO 20040116027 A1, both of which are incorporated herein by reference in their entirety, such that the fabric supports at least 5 lbs at two inches of deflection, which is sufficient to support the majority of the weight of the passenger's head. This minimizes the "point loads" that are exerted by the wing members on the head of the passenger, thereby enhancing passenger comfort.

As an exemplary illustration, for hygiene and to enable replacement of worn materials, the fabric may be installed in a removable form. For example, the fabric may be employed with buttons which snap on complementary grommets deployed on the aft surfaces of the distal edges of the wings. The center may be held in place by a pin which may be slid into and out of place at the attachment points of the fabric. In this embodiment, the fabric may extend through the gap between the two fixed center head cushions. A portion of the cushion material of the headrest wings or other portions of the headrest, in some embodiments, may mask the location of the fasteners to improve aesthetics of the headrest and/or to discourage passengers from modifying the installation of the fabric. The fabric, for example, may be washable and reusable.

Replaceable fabric, in some embodiments, may be designed to incorporate a number of features. For example, the design of the fabric may be branded, such as incorporating an airline name or logo. In another example, the fabric may be hypoallergenic, breathable, or otherwise designed to increase passenger comfort. In a further example, the fabric may include aromatherapeutic properties, such as aromas designed increase passenger tranquility.

In some embodiments, the mounting base may be mounted to a transport vehicle passenger seat via screws to the frame of the passenger seat, which may advantageously provide a secure attachment. In some examples, the mounting base may include mounting tabs that slide over a frame feature on the passenger seat, which may hold it securely and provide quick detachment. In an exemplary example, the mounting base may be riveted to the passenger seat frame, which may provide a quick manufacturing method. In some examples, welding the mounting base to the passenger seat may provide a permanent attachment method.

In some embodiments, the linkages may be of unequal length, which may provide a compound movement (e.g., lateral translation and rotation about a generally vertical axis). In some examples, the uppermost linkage may have a complementary lowermost linkage having the same length. In some embodiments, there may be at least two linkage lengths and 1, 2, 3 or 4 linkages having each linkage length.

In some examples, the flexible fabric may attach in some advantageous location other than between the fixed head cushions. In some embodiments, the extending lateral fingers in the central hinge base may not be separated by slots, but rather the base material may remain uncut between the fingers.

Various embodiments may achieve one or more advantages. For example, some embodiments may provide a seat headrest which includes a mounting plate for attachment to an upper end of a seat back of a seat. Some embodiments may provide first and second slide assemblies mounted in spaced-apart relation on the mounting plate. First and second head-supporting side wings may be mounted on respective arms of the first and second slides for supporting a seat occupant's head against one of the first and second head-supporting side wings and for sliding movement between a relatively narrow spaced-apart position and a relatively wide spaced-apart position.

First and second hinges may be provided on which the first and second head-supporting side wings may be respectively mounted for pivotal movement between a retracted position against the mounting plate and a deployed head-supporting position extending outwardly away from the mounting plate independent of the sliding movement of the first and second head-supporting side wings.

First and second support arms may be positioned on the mounting plate and support the respective first and second head-supporting side wings in a pre-determined angular head-supporting adjusted position and in a pre-determined spaced-apart position relative to the first and second slides.

In some embodiments, the headrest may include first and second roller assemblies carried by respective first and second head-supporting side wings and may be adapted to permit low-friction sliding movement of the first and second head-supporting side wings on the respective first and second slide assemblies.

In some embodiments, the headrest may include first and second slide hinge arms mounted for hinged pivoting movement relative to the respective first and second support arms.

In some embodiments, the first and second side wings may be a rigid plate. In some examples, the headrest may include first and second flexible membranes stretched between respective first and second side wings and a central portion of the mounting plate between the first and second side wings.

In some embodiments, the first and second support arms may be positioned on the mounting plate and may extend outwardly and engage the respective side wings at an oblique angle that varies as the first and second side wings slide along the respective slide assemblies.

In some embodiments, the headrest may include first and second curved, padded tongues attached to the respective side wings and a central portion of the mounting plate between the first and second side wings. In some examples, the first and second curved, padded tongues may extend along an inward-facing surface of the respective first and second side wings and wrapping around respective distal ends of the respective first and second side wings.

First and second slide hinge arms may be mounted for hinged pivoting movement relative to the respective first and second support arms. In an illustrative example, the first and second slide assemblies may be mounted on the mounting plate at an oblique angle such that the side wings lower as they move apart and raise as they move together.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A headrest apparatus for a seated passenger, the apparatus comprising:
    a base frame;
    a center section mounted to the base frame;
    a first wing section and a second wing section, each being coupled to the base frame and disposed laterally of the center section; and
    a flexible fabric extending between each wing section and the center section;
    wherein each of the first and second wing sections articulate between an undeployed position and a deployed position, wherein
        in the undeployed position, an inner edge of the respective wing section is adjacent to the center section and the respective wing section is generally coplanar with the center section, and
        in the deployed position, an inner edge of the respective wing section is laterally spaced apart from the center section relative to the undeployed position and an outer edge of the wing section is positioned forward and laterally outward relative to the undeployed position to the center section, such that the wing section is not generally coplanar with the center section,
    wherein the flexible fabric extending between each wing when in the deployed position is sufficient to support five pounds of the weight of a passenger's head, the remaining weight of the passenger's head being borne by the center section and one of the first wing section and the second wing section.

2. The apparatus of claim 1, wherein each of the first and second wing sections is adapted to be articulated between the deployed position to the undeployed position solely by force applied by a passenger and without the articulation of a button, latch or lock.

3. The apparatus of claim 1, wherein each of the right wing section and the left wing section is individually articulable between the undeployed position and the deployed position.

4. The apparatus of claim 1, wherein, in the undeployed position, a cushion of each wing section abuts a center base cushion connected to the center section.

5. The apparatus of claim 1, wherein in the deployed position, a plane containing the respective wing section and a plane containing the center section intersect to form a deployment angle between about 60 and about 80 degrees.

6. The apparatus of claim 1, wherein the inner edge of the respective wing section is positioned forward and laterally outward relative to the undeployed position to the center section.

7. The apparatus of claim 1, wherein the flexible fabric extending between each wing when in the deployed position is sufficient to support at least 6 pounds of the weight of a passenger's head, the remaining weight of the passenger's head being borne by the center section and one of the first wing section and the second wing section.

8. The apparatus of claim 1, wherein the flexible fabric extending between each wing when in the deployed position is sufficient to support at least 7 pounds of the weight of a passenger's head, the remaining weight of the passenger's head being borne by the center section and one of the first wing section and the second wing section.

9. The apparatus of claim 1, wherein the flexible fabric extending between each wing when in the deployed position is sufficient to support at least 8 pounds of the weight of a passenger's head, the remaining weight of the passenger's head being borne by the center section and one of the first wing section and the second wing section.

10. A headrest apparatus for a seated passenger, the apparatus comprising:
    a base frame;
    a center section;
    a first wing section and a second wing section, each being coupled to the base frame and disposed laterally of the center section;
    a first means for pivotably coupling the first wing section to the base frame, and a second means for pivotably coupling the second wing section to the base frame, wherein each of the first means for pivotably coupling and the second means for pivotably coupling enables the respective wing section to articulate between an undeployed position and a deployed position, wherein
        in the undeployed position, the respective wing section is generally coplanar with the center section, and
        in the deployed position, the respective wing portion is positioned forward and laterally outward relative to the undeployed position, such that the wing section is not generally coplanar with the center section; and
    a flexible fabric extending between each wing section and across the center section wherein,
        in the undeployed position, the flexible fabric is substantially aligned with and proximate to the first wing section, the second wing section, and the center section, and
        in the deployed position, the flexible fabric moves to a hammock position, creating a gap for receiving a portion of the passenger's head;

wherein, in the deployed position,
the flexible fabric is configured to support at least about five pounds of the weight of the passenger's head, and
an elasticity of the flexible fabric is sufficient to permit the fabric to provide a hammock for the passenger's head.

11. The headrest apparatus of claim 10, wherein, in the deployed position, a lower portion of the respective wing section is positioned closer to a center of the passenger seat than an upper portion of the respective wing section.

12. The headrest apparatus of claim 11, wherein a cushion of the respective wing section has a taper angle of at least 15 degrees.

13. The headrest apparatus of claim 10, further comprising a means for retaining each of the first wing section and the second wing section in the deployed position.

14. The headrest apparatus of claim 10, further comprising a means for preventing access to the first means for pivotably coupling and the second means for pivotably coupling from at least a top trajectory.

15. A passenger seat headrest, comprising:
a mounting frame for mounting the headrest to a passenger seat of an aircraft;
a center section comprising a center cushion;
a first wing section and a second wing section, each being pivotably coupled to the mounting frame at opposing sides of the center section; and
a flexible fabric releasably mounted between each wing section and the center section;
wherein each of the first and second wing sections is configured to pivotably articulate between an undeployed position and a deployed position, wherein
in the undeployed position, an inner edge of the respective wing section is adjacent to the center section and the respective wing section is generally coplanar with the center section, and
in the deployed position, an inner edge of the respective wing section is laterally spaced apart from the center section relative to the undeployed position and an outer edge of the wing section is positioned forward and laterally outward relative to the undeployed position to the center section, such that the wing section is not generally coplanar with the center section, and the flexible fabric is disposed such that a gap is provided for receiving a portion of a head of a passenger.

16. The headrest of claim 15, wherein each of the first and second wing sections are configured to pivotably articulate to a narrow spaced-apart position between the undeployed position and the deployed position, and releasably lock into the partially deployed position.

17. The headrest of claim 16, wherein, in the partially deployed position, the inner edge of the respective wing section is laterally closer to the center section relative to the deployed position.

18. The headrest of claim 16, wherein, in both the deployed position and the partially deployed position, the lower portion of the respective wing section is positioned closer to the center of the passenger seat than the upper portion of the respective wing section, forming a deployment angle relative to vertical, wherein the deployment angle of the partially deployed position is smaller than the deployment angle of the deployed position.

* * * * *